(12) United States Patent
Shinzaki

(10) Patent No.: US 7,778,449 B2
(45) Date of Patent: Aug. 17, 2010

(54) BIOMETRIC INFORMATION VERIFYING APPARATUS

(75) Inventor: Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1198 days.

(21) Appl. No.: 10/946,212

(22) Filed: Sep. 22, 2004

(65) Prior Publication Data

US 2005/0175225 A1 Aug. 11, 2005

(30) Foreign Application Priority Data

Feb. 6, 2004 (JP) ............... 2004-031307

(51) Int. Cl.
G06K 9/00 (2006.01)
G06K 9/64 (2006.01)
G06K 9/48 (2006.01)

(52) U.S. Cl. .................. 382/124; 382/217; 382/197

(58) Field of Classification Search .......... 382/124, 382/197, 217
See application file for complete search history.

(56) References Cited

U.S. PATENT DOCUMENTS

| | | | |
|---|---|---|---|
| 4,325,570 A | 4/1982 | Estrada | 283/7 |
| 5,909,501 A | 6/1999 | Thebaud | 382/124 |
| 5,926,555 A | 7/1999 | Ort et al. | 382/124 |
| 6,134,340 A * | 10/2000 | Hsu et al. | 382/124 |
| 6,356,649 B2 | 3/2002 | Harkless et al. | 382/115 |
| 2003/0091218 A1 | 5/2003 | Hamid | 382/124 |
| 2003/0169910 A1* | 9/2003 | Reisman et al. | 382/124 |
| 2004/0096086 A1* | 5/2004 | Miyasaka et al. | 382/124 |

FOREIGN PATENT DOCUMENTS

| | | |
|---|---|---|
| JP | 1-248284 | 10/1989 |
| JP | 6-223160 | 8/1994 |
| JP | 6274602 | 9/1994 |
| JP | 2002-329205 | 11/2002 |
| JP | 2003-30661 | 1/2003 |
| KR | 96-005109 | 4/1996 |

(Continued)

OTHER PUBLICATIONS

Korean Patent Office Action for corresponding Korean Patent Application No. 10-2004-91266 dated Mar. 6, 2006.

(Continued)

*Primary Examiner*—Bhavesh M Mehta
*Assistant Examiner*—Kathleen S Yuan
(74) *Attorney, Agent, or Firm*—Staas & Halsey LLP

(57) ABSTRACT

The apparatus greatly reduces the registered data amount and the verification computation amount required for user verification, in comparison with the verification using image information itself, and also decreases the false verification rate. The apparatus divides a biometric information image into cells, and extracts minutia information as well as cell basic information from the individual cells. After comparison of direction information of the individual cells of the registered data with direction information of the individual cells of the to-be-verified data, thereby aligning the registered fingerprint image and the to-be-verified fingerprint image, the apparatus compares the minutia information of corresponding cells between the registered data and the to-be-verified data to make a match/non-match decision. Such an apparatus is applicable to systems that employ pattern matching type image verification to perform user verification utilizing biometric information such as fingerprints, palm prints, blood vessel patterns, iris patterns, and facial images.

36 Claims, 21 Drawing Sheets

FOREIGN PATENT DOCUMENTS

| | | |
|---|---|---|
| KR | 2001-0000379 | 1/2001 |
| WO | WO 2004/015615 A1 | 2/2004 |

OTHER PUBLICATIONS

"$2^{nd}$ Working Draft Text for 19794-3, Biometric Data Interchange Formats-Part 3: Finger Pattern Data", ISO/IEC JTC 1/SC 37 N313, Oct. 3, 2003.

Hamilton, "White Paper: Biometrics as a Privacy Enhancing Technology", Saflink Corporation, Online! 2003, pp. 1-4.

Guckes, "Contribution from the National Body of Germany on SC 37 N313, Replacement Text for WD 19794-3, Biometrics—Biometric Data Interchange Formats—Part 3: Finger Pattern Data", $3^{rd}$ Meeting NI-37 (Biometrie) Dec. 15, 2005.

Prabhakar, et al., "Detection-Level Fusion in Fingerprint Verification", Pattern Recognition, vol. 35, No, 4, Apr. 2002, pp. 861-874.

Ross et al., "A Hybrid Fingerprint Matcher", Pattern Recognition, 2002, Proceedings, $16^{th}$ International Conference, Quebec, Canada, Aug. 11-15, 2002, pp. 795-798.

ISO/IEC JTC 1/SC 37 N313 (Oct. 3, 2003; $2^{nd}$ Working Draft Text for 19794-3; , Biometric Data Interchange Formats-Part 3: Finger Pattern Data).

Japanese Office Action issued on Mar. 10, 2009 in corresponding Japanese Patent Application 2004-031307.

\* cited by examiner

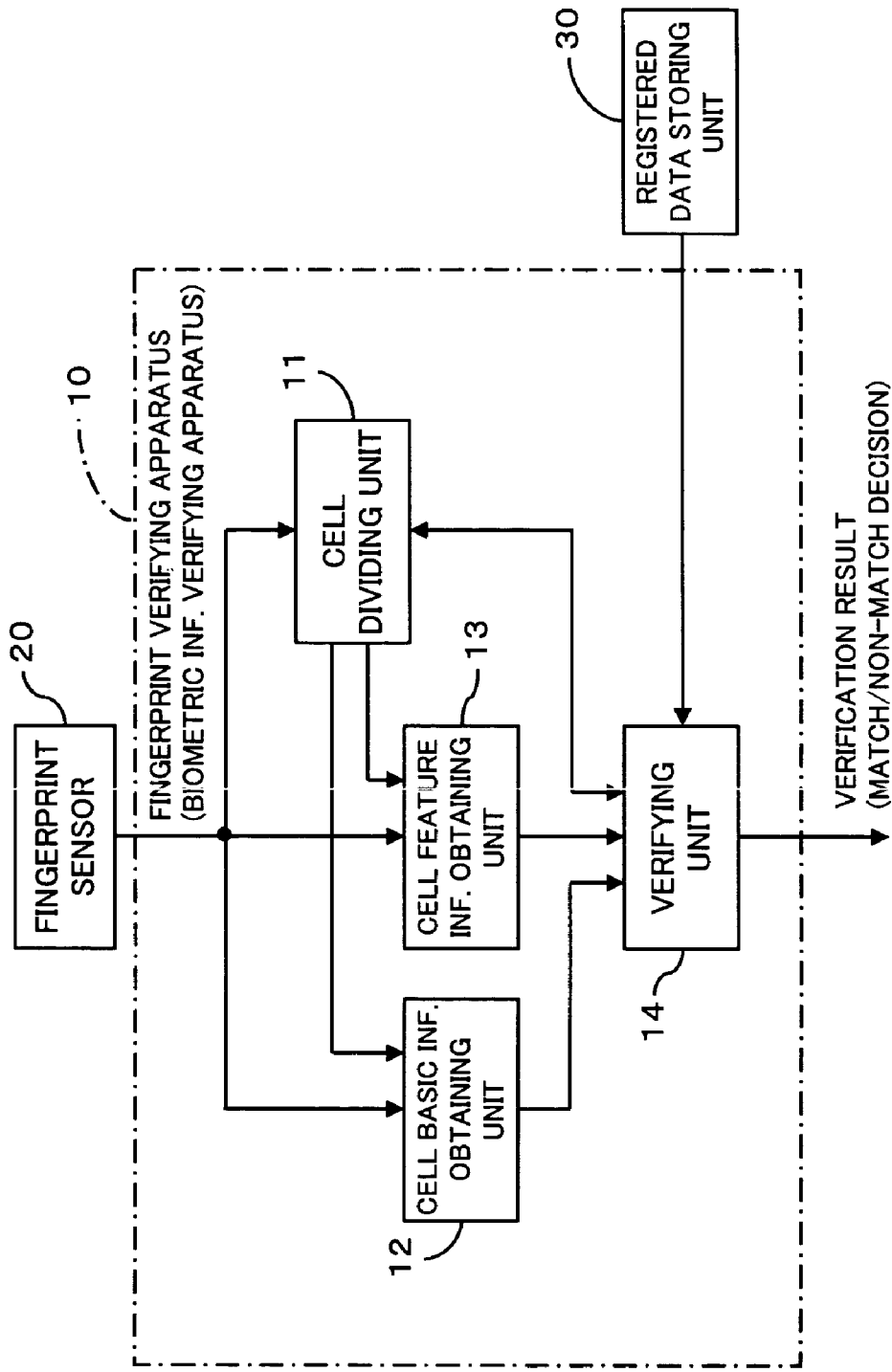

FIG. 2A
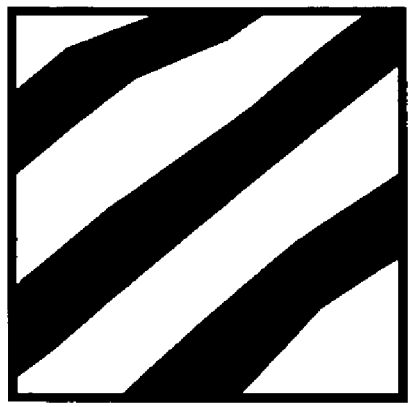
FIG. 2B
FIG. 3
| TYPE | SIZE | NUMBER |
|---|---|---|
| Mk0_Mn | 2bits | 0-2, 3(unknown) |
| Mk1_Mn | 2bits | 0-2, 3(unknown) |
| TOTAL | 4bits | |

FIG. 7A
FIG. 7B
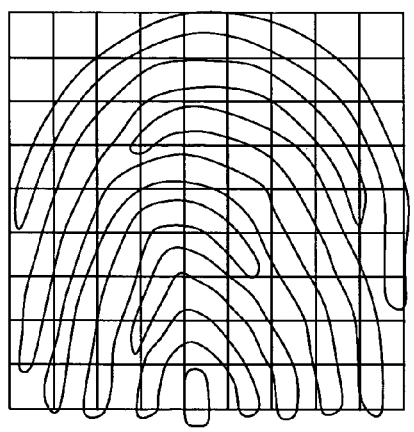
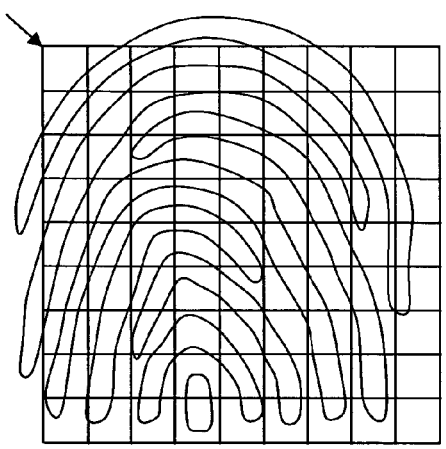
SHIFT THE CELL DIVIDING REFERENCE POINT

| TYPE | SIZE | NUMBER |
|---|---|---|
| Sc0_Mk0_Mn | 2bits | 0-2, 3(unknown) |
| Sc0_Mk1_Mn | 2bits | 0-2, 3(unknown) |
| Sc1_Mk0_Mn | 2bits | 0-2, 3(unknown) |
| Sc1_Mk1_Mn | 2bits | 0-2, 3(unknown) |
| Sc2_Mk0_Mn | 2bits | 0-2, 3(unknown) |
| Sc2_Mk1_Mn | 2bits | 0-2, 3(unknown) |
| Sc3_Mk0_Mn | 2bits | 0-2, 3(unknown) |
| Sc3_Mk1_Mn | 2bits | 0-2, 3(unknown) |
| TOTAL | 2bytes | |

BIOMETRIC INFORMATION VERIFYING APPARATUS

BACKGROUND OF THE INVENTION

1. Field of the Invention

The present invention relates to biometric information verifying apparatus which verify users by use of biometrics information such as fingerprints, palm prints, blood vessel patterns, iris patterns, facial images. The apparatus verifies biometric information images input by users at the time of verification against biometric information images registered in advance at enrollment. The invention particularly relates to biometric information verifying apparatus in which a pattern matching method of image verification is employed.

2. Description of the Related Art

Pattern matching is a method commonly used in extracting human figure images, facial images, or specific object images such as vehicles, from picture images. The method is also widely used in user verification utilizing biometric information such as fingerprints, palm prints, blood vessel patterns, iris patterns, and facial images. The application of this pattern matching is not limited to verification between two-dimensional images, and it also covers one-dimensional signal recognition such as voice recognition.

Here, concrete examples of pattern matching employed in fingerprint image verification will be described hereinbelow, referring to relevant drawings. FIG. 21A and FIG. 21B show fingerprint images 1 and 2 to be subjected to pattern matching. Referring to FIG. 22A through FIG. 22C, a description will now be given of procedures of pattern matching between the fingerprint image 1 of FIG. 21A and the fingerprint image 2 of FIG. 21B. Note that the fingerprint image 1 is simply outlined in these drawings so that overlap between the two fingerprints, 1 and 2, can be clearly seen.

The basics of pattern matching lie in searching a position where the degree of overlap between two object images, 1 and 2, is a maximum (or where the two images are overlapped best), while shifting the two object images, 1 and 2, little by little, to evaluate the overlap degree.

For instance, the image 1 of FIG. 21A is laid over the image 2 of FIG. 21B, and the image 1 is then gradually shifted in the x direction or the y direction, as shown in FIG. 22A and FIG. 22B, to find a position of FIG. 22C where the overlap degree between the two images 1 and 2 is a highest value. The overlap degree is evaluated at that position, whereby the two images 1 and 2 are verified against each other (whether or not the two images 1 and 2 are matched with each other, that is, whether or not the two fingerprint images belong to the same person).

The degree of overlap between the images 1 and 2 is obtained by the following computation. The product of the pixel values of an individual pair of overlapping pixels, one from the image 1 and the other from the image 2, is calculated, and such products obtained from the individual overlapping pixel pairs are summed up in an overlap area between the two images 1 and 2, thereby obtaining the degree of overlap therebetween. The better the images 1 and 2 match with each other, the larger the thus calculated overlap degree becomes. Therefore, when fingerprint or facial images are subjected to verification, a match decision between the object images is often made depending on the overlap degree. That is, if the overlap degree exceeds a predetermined threshold, it is judged that the images match up with each other.

Such a simple algorithm of pattern matching facilitates its implement. However, since the calculation of the overlap degree between the images 1 and 2 needs to use all the pixel values of the two object images 1 and 2, not only the verification operation amount is increased but also the registered data amount is extremely increased.

Hence, as shown in FIG. 23, there has been developed a technique in which both the fingerprint images {one is a previously registered fingerprint image; the other is a fingerprint image (to-be-verified fingerprint image) input by a user at verification}, which is to be subjected to pattern matching, are divided into cells, and pattern matching processing is carried out on the thus divided images.

This technique extracts a data set (ridge direction $\theta$, pitch $\lambda$, and offset amount $\delta$) such as that which is disclosed in the following non-patent document 1, as cell basic information, from the individual cells (see FIG. 24B). Here, as shown in FIG. 24B, ridge direction $\theta$ is the direction of the normal to a ridge contained in each cell; ridge pitch $\lambda$ is the amount of spacing between adjacent ridges contained in the cell; offset amount $\delta$ is a minimum distance from the reference point (for example, the lower-left corner of a cell) to the closest ridge in the cell.

FIG. 23 is an example fingerprint image which is divided into cells; FIG. 24A is a view showing an example cell, which is one of the cells that are obtained by dividing a fingerprint image into cells; FIG. 24B is a view for use in describing cell basic information extracted and obtained from the cell of FIG. 24A.

When a fingerprint image is stored as a registered fingerprint image, the three parameters $\theta$, $\lambda$, and $\delta$ of the individual cells are stored instead of the image information itself, whereby the registered data amount is greatly reduced.

Further, at verification between the two fingerprint images, cell basic information (to-be-verified data) extracted from the individual cells of the to-be-verified fingerprint image is compared with registered cell basic information (registered data) that was previously extracted from the registered fingerprint image. If the comparison result satisfies a predetermined condition, it is judged that the two images match up with each other. With this arrangement, the verification operation amount is greatly reduced in comparison with the pattern matching that uses image information itself.

[Non-patent document 1] ISO/IEC JTC 1/SC 37 N313 (2003-10-3; 2nd Working Draft Text for 19794-3, Biometric Data Interchange Formats-Part 3: Finger Pattern Data), [searched on Feb. 6, 2004], on the Internet <URL: http://www.jtcl.org/navigation.asp?Mode=Browse&Area=Document&SubComm=ISO/IECJTClSC00037&CommLevel=SC&SCCOD E=SC+37>

According to the above previous art, cell basic information extracted from the individual cells is stored and is then used in verification in place of image information itself, thereby greatly reducing the registered data amount and the verification operation amount. However, the art is disadvantageous in that it can use only fingerprint shape information in pattern matching (verification), totally ignoring information of fingerprint minutiae (ridge bifurcations and endings).

In this manner, the previous art has a problem that it is difficult to utilize minutia information, which is the most defining feature in fingerprints, in pattern matching (verification), so that the false verification rate is difficult to be lowered.

SUMMARY OF THE INVENTION

With the foregoing problems in view, it is an object of the present invention to provide a biometric information verifying apparatus in which a biometric information image is divided into cells and minutia information (for example, the types and the numbers of minutia points, or the presence or absence of minutiae) as well as cell basic information (for example, ridge direction, pitch, and offset amount) is then extracted from the individual cells, and in which pattern matching-type verification is made in consideration of the thus extracted minutia information. The apparatus of the present invention will reduce the registered data amount and the verification operation amount, in comparison with verification utilizing image information itself, and the apparatus also greatly decreases the false verification rate, too.

In order to accomplish the above object, according to the present invention, there is provided a biometric information verifying apparatus which compares a registered biometric information image and a to-be-verified biometric information image input by a user at user verification, which apparatus comprises: a cell dividing unit which divides the to-be-verified biometric information image into cells; a cell basic information obtaining unit which obtains cell basic information from the individual cells that are obtained by the cell dividing unit, the cell basic information including direction information of the to-be-verified biometric information image contained in the individual cells; a cell feature information obtaining unit which obtains minutia information of the to-be-verified biometric information image, as cell feature information, from the individual cells that are obtained by the cell dividing unit; and a verifying unit which verifies the to-be-verified biometric information image against the registered biometric information image by comparison between registered data and to-be-verified data. The registered data includes: (i) cell basic information obtained from individual cells making up the registered biometric information image, which cell basic information includes direction information of the registered biometric information image contained in the individual cells; and (ii) cell feature information obtained from the individual cells making up the registered biometric information image, which cell feature information includes minutia information of the registered biometric information image contained in the individual cells. The to-be-verified data includes the cell basic information and the cell feature information, which are obtained by the cell basic information obtaining unit and the cell feature information obtaining unit, respectively. The verifying unit compares the direction information of the individual cells of the to-be-verified biometric information image and the direction information of the individual cells of the registered biometric information image, and aligns the to-be-verified biometric information image and the registered biometric information image with each other, and compares at least the minutia information of corresponding cells between the to-be-verified data and the registered data to evaluate whether or not the comparison result satisfies a predetermined match condition. If the comparison result satisfies the predetermined match condition, the verifying unit makes a match decision, in which the to-be-verified biometric information image and the registered biometric information image are judged to belong to one and the same user.

As a preferred feature, if the comparison result does not satisfy the predetermined match condition, the cell diving unit shifts a cell division reference point by a predetermined amount, and redivides the to-be-verified biometric information image into cells, and the cell basic information obtaining unit and the cell feature information obtaining unit reobtain to-be-verified data from the individual cells that are obtained by the redivision by the cell dividing unit, and the verifying unit compares the reobtained direction information of the individual cells of the to-be-verified biometric information image and the direction information of the individual cells of the registered biometric information image, and realigns the to-be-verified biometric information image and the registered biometric information image with each other, and compares at least the minutia information of corresponding cells between the registered data and the to-be-verified data to reevaluate whether or not the comparison result satisfies the predetermined match condition. If the comparison result satisfies the predetermined match condition, the verifying unit makes a match decision, in which the to-be-verified biometric information image and the registered biometric information image are judged to belong to one and the same user.

As a generic feature, there is provided a biometric information verifying apparatus which compares a registered biometric information image and a to-be-verified biometric information image input by a user at user verification, which apparatus comprises: a cell dividing unit which divides the to-be-verified biometric information image into cells; a cell basic information obtaining unit which obtains cell basic information from the individual cells that are obtained by the cell dividing unit, the cell basic information including direction information of the to-be-verified biometric information image contained in the individual cells; a cell feature information obtaining unit which obtains minutia information of the to-be-verified biometric information image, as cell feature information, from the individual cells that are obtained by the cell dividing unit; and a verifying unit which verifies the to-be-verified biometric information image against the registered biometric information image by comparison between registered data and to-be-verified data. The registered data includes: (i) cell basic information obtained from individual cells making up the registered biometric information image, which cell basic information includes direction information of the registered biometric information image contained in the individual cells; and (ii) cell feature information obtained from the individual cells making up the registered biometric information image, which cell feature information includes minutia information of the registered biometric information image contained in the individual cells. The to-be-verified data includes the cell basic information and the cell feature information, which are obtained by the cell basic information obtaining unit and the cell feature information obtaining unit, respectively. The verifying unit compares the direction information of the individual cells of the to-be-verified biometric information image and the direction information of the individual cells of the registered biometric information image, and aligns the to-be-verified biometric information image and the registered biometric information image with each other, and evaluates whether or not the direction information comparison result satisfies a predetermined alignment condition. If the direction information comparison result satisfies the predetermined alignment condition, the evaluating unit compares at least the minutia information of corresponding cells between the to-be-verified data and the registered data to evaluate whether or not the comparison result satisfies a predetermined match condition. If the comparison result satisfies the predetermined match condition, the evaluation unit makes a match decision, in which the to-be-verified biometric information image and the registered biometric information image are judged to belong to one and the same user.

As another generic feature, there is provided a biometric information verifying apparatus which compares a registered biometric information image and a to-be-verified biometric information image input by a user at user verification, which apparatus comprises: a cell dividing unit which divides the to-be-verified biometric information image into cells; a cell basic information obtaining unit which obtains cell basic information from the individual cells that are obtained by the cell dividing unit, the cell basic information including direction information, pitch information, and offset information, of the to-be-verified biometric information image contained in the individual cells; a cell feature information obtaining unit which obtains minutia information of the to-be-verified biometric information image, as cell feature information, from the individual cells that are obtained by the cell dividing unit; and a verifying unit which verifies the to-be-verified biometric information image against the registered biometric information image by comparison between registered data and to-be-verified data. The registered data includes: (i) cell basic information obtained from individual cells making up the registered biometric information image, which cell basic information includes direction information, pitch information, and offset information, of the registered biometric information image contained in the individual cells; and (ii) cell feature information obtained from the individual cells making up the registered biometric information image, which cell feature information includes minutia information of the registered biometric information image contained in the individual cells. The to-be-verified data includes the cell basic information and the cell feature information, which are obtained by the cell basic information obtaining unit and the cell feature information obtaining unit, respectively. The verifying unit compares the minutia information of the individual cells of the to-be-verified biometric information image and the minutia information of the individual cells of the registered biometric information image, and aligns the to-be-verified biometric information image and the registered biometric information image with each other, and evaluates whether or not the minutia information comparison result satisfies a predetermined alignment condition. If the minutia information comparison result satisfies the predetermined alignment condition, the verifying unit compares the cell basic information of corresponding cells between the to-be-verified data and the registered data. If the cell basic information comparison result satisfies a predetermined match condition, the verifying unit makes a match decision, in which the to-be-verified biometric information image and the registered biometric information image are judged to belong to one and the same user.

As still another generic feature, there is provided a biometric information verifying apparatus which compares a registered biometric information image and a to-be-verified biometric information image input by a user at user verification, which apparatus comprises: a cell dividing unit which divides the to-be-verified biometric information image into cells; a cell basic information obtaining unit which obtains cell basic information from the individual cells that are obtained by the cell dividing unit, the cell basic information including direction information, pitch information, and offset information, of the to-be-verified biometric information image contained in the individual cells; a cell feature information obtaining unit which obtains minutia information of the to-be-verified biometric information image, as cell feature information, from the individual cells that are obtained by the cell dividing unit; and a verifying unit which verifies the to-be-verified biometric information image against the registered biometric information image by comparison between registered data and to-be-verified data. The registered data includes: (i) cell basic information obtained from individual cells making up the registered biometric information image, which cell basic information includes direction information, pitch information, and offset information, of the registered biometric information image contained in the individual cells; and (ii) cell feature information obtained from the individual cells making up the registered biometric information image, which cell feature information includes minutia information of the registered biometric information image contained in the individual cells. The to-be-verified data includes the cell basic information and the cell feature information, which are obtained by the cell basic information obtaining unit and the cell feature information obtaining unit, respectively. The verifying unit compares the direction information of the individual cells of the to-be-verified biometric information image and the direction information of the individual cells of the registered biometric information image, and aligns the to-be-verified biometric information image and the registered biometric information image with each other, and then compares the pitch information and the offset information of corresponding cells between the to-be-verified data and the registered data, and evaluates whether or not the pitch and offset information comparison result satisfies a predetermined alignment condition. If the pitch and offset information comparison result satisfies the predetermined alignment condition, the verifying unit compares the minutia information of corresponding cells between the to-be-verified data and the registered data, and evaluates whether or not the minutia information comparison result satisfies a predetermined match condition. If the minutia information comparison result satisfies the predetermined match condition, the verifying unit makes a match decision, in which the to-be-verified biometric information image and the registered biometric information image are judged to belong to one and the same user.

As a preferred feature, in the present biometric information verifying apparatus, the biometric information image is a ridge image obtained from a biometric pattern, and the apparatus further comprises a pattern center detecting unit which detects a center of the biometric pattern contained in the to-be-verified biometric information image, and the cell dividing unit divides the to-be-verified biometric information image into cells, based on a cell division reference point which is calculated based on the pattern center detected by the pattern center detecting unit.

As another preferred feature, the minutia information included in the registered data is obtained from individual sub-cells, which are obtained by dividing each individual cell into two or more sub-cells, and the cell feature information obtaining unit, when obtaining the minutia information from the individual cells of the to-be-verified biometric information image, divides each of the individual cells into two or more sub-cells, and obtains the minutia information from the individual sub-cells, and the verifying unit, when comparing the minutia information of corresponding cells between the registered data and the to-be-verified data, performs the minutia information comparison for the individual sub-cells.

As still another preferred feature, an unclear cell, of the individual cells obtained by dividing the to-be-verified biometric information image, is assigned a light weight in relation to the cell feature information comparison result.

As a further feature, the minutia information includes: the minutia types contained in the individual cells; and the number of minutia points for each minutia type contained in the individual cells. Alternatively, the minutia information can include only information about the presence or absence of minutiae in the individual cells.

The foregoing biometric information verifying apparatus divides a biometric information image into cells, and extracts minutia information (the types and the numbers of minutia points, or the presence or absence of a minutia) as well as cell basic information (ridge direction, pitch, and offset amount) from the individual cells, and then performs pattern matching-type verification in consideration of the thus extracted minutia information. This apparatus makes it possible to reduce the registered data amount and the verification operation amount, in comparison with verification utilizing image information itself, while greatly decreasing the false verification rate, too.

Other objects and further features of the present invention will be apparent from the following detailed description when read in conjunction with the accompanying drawings.

BRIEF DESCRIPTION OF THE DRAWINGS

FIG. 1 is a block diagram showing a functional construction of a biometric information verifying apparatus (fingerprint verifying apparatus) according to a first through a sixth embodiment of the present invention;

FIG. 2A is a view showing an example cell containing no fingerprint minutia; FIG. 2B shows an example cell containing fingerprint minutiae;

FIG. 3 is a table showing an example format of minutia information (cell feature information) obtained and stored for each cell;

FIG. 7A is a fingerprint image which is divided into cells; FIG. 7B is a fingerprint image in which the cell division reference point is shifted;

DESCRIPTION OF THE PREFERRED EMBODIMENT(S)

Embodiments of the present invention will now be described with reference to the accompanying drawings.

First of all, a description will be made of biometric information verifying apparatus (fingerprint verifying apparatus) according to a first through a sixth embodiment of the present invention, referring to FIG. 1 which shows a functional construction of the apparatus.

As shown in FIG. 1, a fingerprint verifying apparatus 10 of the first through the sixth embodiment verifies a to-be-verified fingerprint image (a to-be-verified biometric information image; a ridge image of a biometric pattern), which is input by a user at the time of user verification, against a registered fingerprint image (a registered biometric information image; a ridge image of a biometric pattern), and the fingerprint verifying apparatus 10 is connected to the fingerprint sensor 20 and the registration data storing unit 30.

At user verification, the fingerprint sensor 20 is used to input the to-be-verified fingerprint image therethrough to the fingerprint verifying apparatus 10, and the registration data storing unit 30, which previously stores registered data (will be described later) extracted and obtained from a to-be-registered fingerprint image, provides the registered data to the fingerprint verifying apparatus 10 (verifying unit 14).

The registered data stored in the registration data storing unit 30 includes cell basic information of a fingerprint image contained in individual cells, which are obtained by dividing the to-be-registered fingerprint image into cells, and also minutia information (cell feature information) of the individual cells.

Figure 24A:
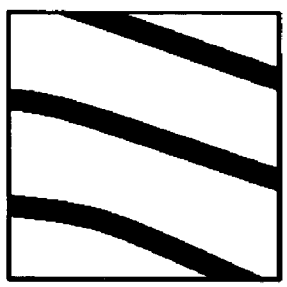
FIG. 24A is a view showing an example cell, which is one of the cells that are obtained by dividing a fingerprint image into cells.
Figure 24B:
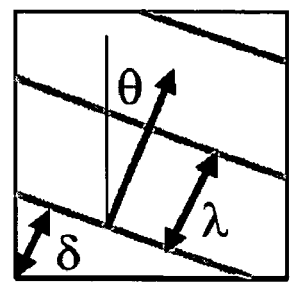
FIG. 24B is a view for use in describing cell basic information extracted and obtained from the cell of FIG. 24A.

Similar to the example already described with reference to FIG. 24B, the cell basic information of an individual cell includes the ridge direction θ, the ridge pitch λ, and the offset amount δ. As in the case of the above description, the ridge direction θ is the direction of the normal to a ridge contained in the cell; the ridge pitch λ is the amount of spacing between adjacent ridges contained in the cell; the offset amount δ is a minimum distance from the reference point (for example, the lower-left corner of a cell) to the closest ridge in the cell.

The minutia information (cell feature information) can include information about the presence or absence of any fingerprint minutia in individual cells. In addition, the minutia information can also include the types (bifurcations and ridge endings) of fingerprint minutiae and the number of minutia points for each minutia type contained in the individual cells.

If the information about the presence or absence of a fingerprint minutia is employed as the minutia information, 1-bit minutia information indicating the presence or absence of a fingerprint minutia is obtained from the individual cells as data to be registered, and is then stored in the registration data storing unit 30. For example, "0" is stored as minutia information for a cell which contains no minutia point therein (see FIG. 2A), while "1" is stored as minutia information for a cell which contains minutia points therein (see FIG. 2B).

As shown in FIG. 3, if the types and the numbers of minutiae are employed as minutia information, 2-bit information about the number of bifurcations (Mk0_Mn) and 2-bit information about the number of ridge endings (Mk1_Mn) in individual cells are stored as registered data. That is, 4-bit information about the number of minutia points (the first two bits indicate the number of bifurcations and the latter two bits indicate the number of ridge endings) is extracted and stored. More precisely, the 2-bit number information for each minutia type is as follows: "00" indicates the number of 0; "01" indicates the number of 1; "10" indicates the number of 2; "11" indicates "unknown (unknown quantity or greater than 2)". For instance, since the cell of FIG. 2A does not contain any minutia point, its 4-bit number information is "0000". On the other hand, since the cell of FIG. 2B contains one ridge ending and one bifurcation, its 4-bit number information is "0101". Here, the table of FIG. 3 indicates an example format of minutia information (cell feature information) obtained and stored for each cell.

In this manner, the registration data storing unit 30 stores individual data sets [cell basic information (a ridge direction θ, a ridge pitch λ, and an offset amount δ) and minutia information] which are extracted, one from each cell of the registered fingerprint image, as registration data of an enrolled user. The number of the data sets stored in the registration data storing unit 30 equals the number of cells the registered fingerprint image has been divided into.

Here, as shown in FIG. 1, the fingerprint verifying apparatus 10 of the first to the sixth embodiment, has a cell dividing unit 11, a cell basic information obtaining unit 12, a cell feature information obtaining unit 13, and a verifying unit 14.

The cell dividing unit 11 divides a to-be-verified fingerprint image, which is input through the fingerprint sensor 20 at user verification, into cells (the same as the cells into which the registered fingerprint image is divided).

The cell basic information obtaining unit 12 extracts and obtains cell basic information (ridge direction θ, ridge pitch λ, and offset amount δ, similar to the above definition) of the individual cells, which are obtained by the cell dividing unit 11, as to-be-verified data.

The cell feature information obtaining unit 13 extracts and obtains minutia information (cell feature information) of the individual cells, which are obtained by the cell dividing unit 11, as to-be-verified data. This extracted minutia information can be information about the presence or absence of a minutia point or the type and number of minutiae, and the types of minutia information extracted/obtained here are of course the same as those that are registered in the registration data storing unit 30.

The verifying unit 14 verifies the to-be-verified fingerprint image against the registered fingerprint image and, using the registered data provided by the registration data storing unit 30 and the to-be-verified data extracted/obtained by the cell basic information obtaining unit 12 and the cell feature information obtaining unit 13.

The procedures of fingerprint verification carried out by the cell dividing unit 11, the cell basic information obtaining unit 12, the cell feature information obtaining unit 13, and the verifying unit 14, depend on the following embodiments.

The registration data storing unit 30 can be provided as a built-in or an attached unit of the fingerprint verifying apparatus 10, or it can be connected to the fingerprint verifying apparatus 10 through a communication network. In any case, the registration data storing unit 30 is connected to the fingerprint verifying apparatus 10 so as to provide the fingerprint verifying apparatus 10 with registered data corresponding to a candidate user who is to be verified. Further, as in the case of the aforementioned to-be-verified data, registration data can also be extracted and obtained from a fingerprint, which is input through the fingerprint sensor 20 at user enrollment, by means of the cell dividing unit 11, the cell basic information obtaining unit 12, and the cell feature information obtaining unit 13.

[1] First Embodiment

Figure 4:
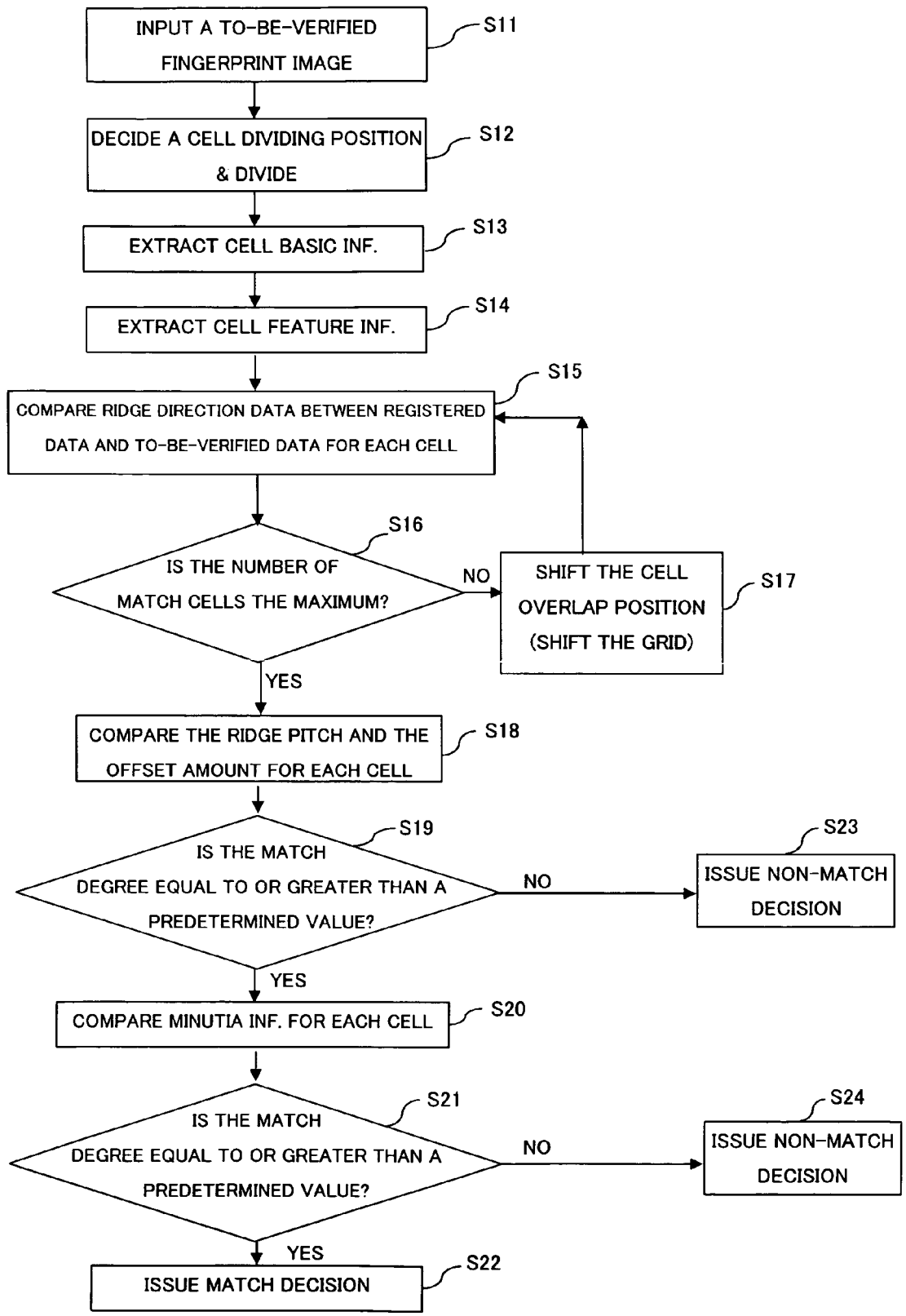
FIG. 4 is a flowchart indicating an operation of the biometric information verifying apparatus (fingerprint verifying apparatus) according to a first embodiment of the present invention.
Figure 5:
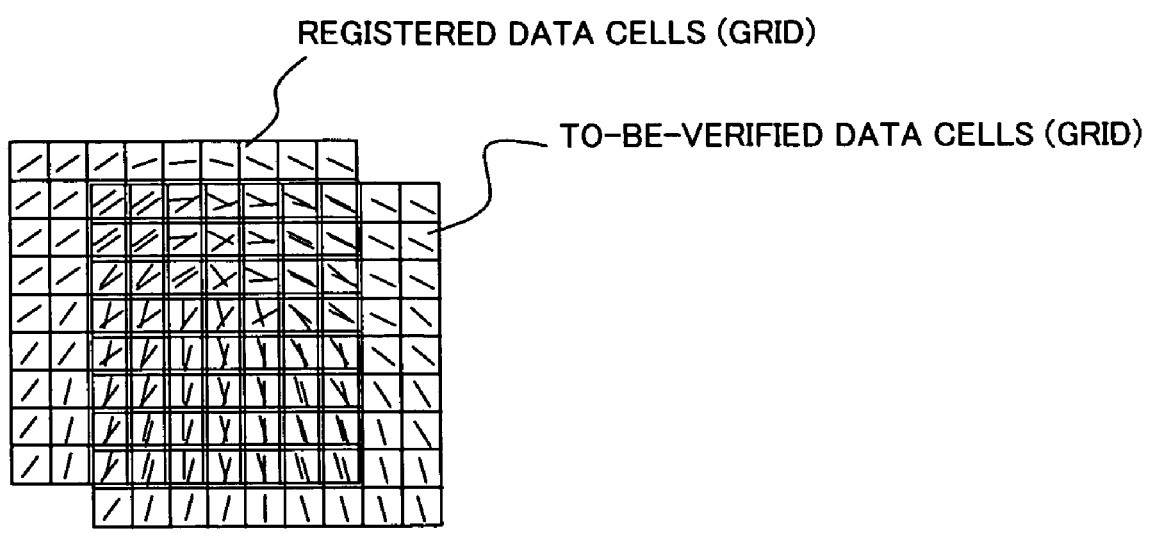
FIG. 5 is a view for use in describing a method for aligning a registered fingerprint image and a to-be-verified fingerprint image based on ridge direction data which is obtained from each cell.

Referring to FIG. 4 and FIG. 5, a description will now be made of an operation of a biometric information verifying apparatus (fingerprint verifying apparatus) 10 of a first embodiment of the present invention. FIG. 4 shows a flowchart indicating the operation; FIG. 5 shows procedures for aligning a registered fingerprint image and a to-be-verified fingerprint image by using ridge direction data obtained from the individual cells of those images.

As shown in FIG. 4, in the fingerprint verifying apparatus 10 of the first embodiment, when a user inputs a fingerprint image (to-be-verified fingerprint image) through a fingerprint sensor 20 at user verification (step S11), a cell dividing unit 11 decides a cell dividing position and divides the input to-be-verified fingerprint image, input through the fingerprint sensor 20, into cells which are the same as the cells used at cell division performed at user enrollment (step S12). The cell basic information obtaining unit 12 and the cell feature information obtaining unit 13 then extract and obtain cell basic information (ridge direction θ, ridge pitch λ, and offset amount δ) and minutia information, respectively, from the fingerprint image contained in the individual cells, which are obtained by the cell dividing unit 11, as to-be-verified data (step S13 and step S14).

The verifying unit 14 performs the following processing (step S15 through step S24).

First of all, the verifying unit 14 compares ridge directions θ of the individual cells of registered data provided by the registration data storing unit 30 with ridge directions θ of the individual cells extracted and obtained at step S13, thereby aligning the registered fingerprint image (or registered data cells) and the to-be-verified fingerprint image (or to-be-verified data cells) (step S15 through step S17), as shown in FIG. 5. At this time, the alignment is performed, such that the number of match cell pairs, which are pairs of cells, one from the registered data and the other from the to-be-verified data, whose ridge directions θ coincide with each other, is a maximum.

More concretely, the registered data cells and the to-be-verified data cells are superposed to compare their directions θ (step S15), and then the verifying unit 14 evaluates whether or not the number of match cell pairs is a maximum (step S16). If the evaluation result is negative (NO route of step S16), the cell alignment position is shifted (that is, the grid is shifted; step S17), and the processing then returns to step S15, and direction θ comparison is performed once again. These procedures are repeated until it is judged that the number of match cell pairs is a maximum (YES decision is made) at step S16. Here, the evaluation at step S16 can be made of "whether or not a match cell ratio is equal to or greater than a predetermined value", instead of "whether or not the number of match cell pairs is a maximum". In this case, the image alignment is performed, such that a match cell ratio (a ratio of the number of match cells to the total number of cells) is equal to or greater than a predetermined value.

After the registered data cells and the to-be-verified data cells are aligned such that the number of match cell pairs is a maximum (YES route of step S16), ridge pitches and offset amounts of corresponding cells between the registered data and the to-be-verified data are compared (step S18), and the verifying unit 14 evaluates whether or not the comparison result satisfies a predetermined match condition (whether or not the match degree is equal to or greater than a predetermined value) (step S19).

If the match degree between the ridge pitches and the offset amounts is equal to or greater than a predetermined value (YES route of step S19), minutia information of the corresponding cells between the registered data and the to-be-verified data are compared (step S20), and then evaluates whether or not the comparison result satisfies a predetermined match condition (whether or not the match degree is equal to or greater than a predetermined value) (step S21). At this time, if the minutia information includes minutia types and the number of minutia points for each minutia type, the minutia types and the number of minutia points for each minutia type are compared in the corresponding cells between the registered data and the to-be-verified data.

If the match degree of the minutia information is equal to or greater than a predetermined value (YES route of step S21), a match decision is made (step S22). That is, it is judged that the registered fingerprint image (registered data) and the to-be-verified fingerprint image (to-be-verified data) are obtained from the same user (fingertip). On the other hand, if the match degree is judged to be smaller than the predetermined value at step S19 and at step S21 (NO route), a non-match decision is made (step S23 and step S24). That is, it is judged that the registered fingerprint image (registered data) and the to-be-verified fingerprint image (to-be-verified data) do not belong to the same user (fingertip).

In this manner, according to the first embodiment, the cell basic information (ridge direction θ, ridge pitch λ, and offset amount δ) and the minutia information (the type and the number of minutiae, or information about the presence or absence of minutia points) are extracted from the individual cells, which are obtained by dividing a fingerprint image into cells. Thus, since pattern-matching verification is performed in consideration of the minutia information, the registered data amount and the verification operation amount are greatly reduced in comparison with user verification by use of image information itself, while the false verification rate is greatly reduced at the same time.

[2] Second Embodiment

Figure 6:
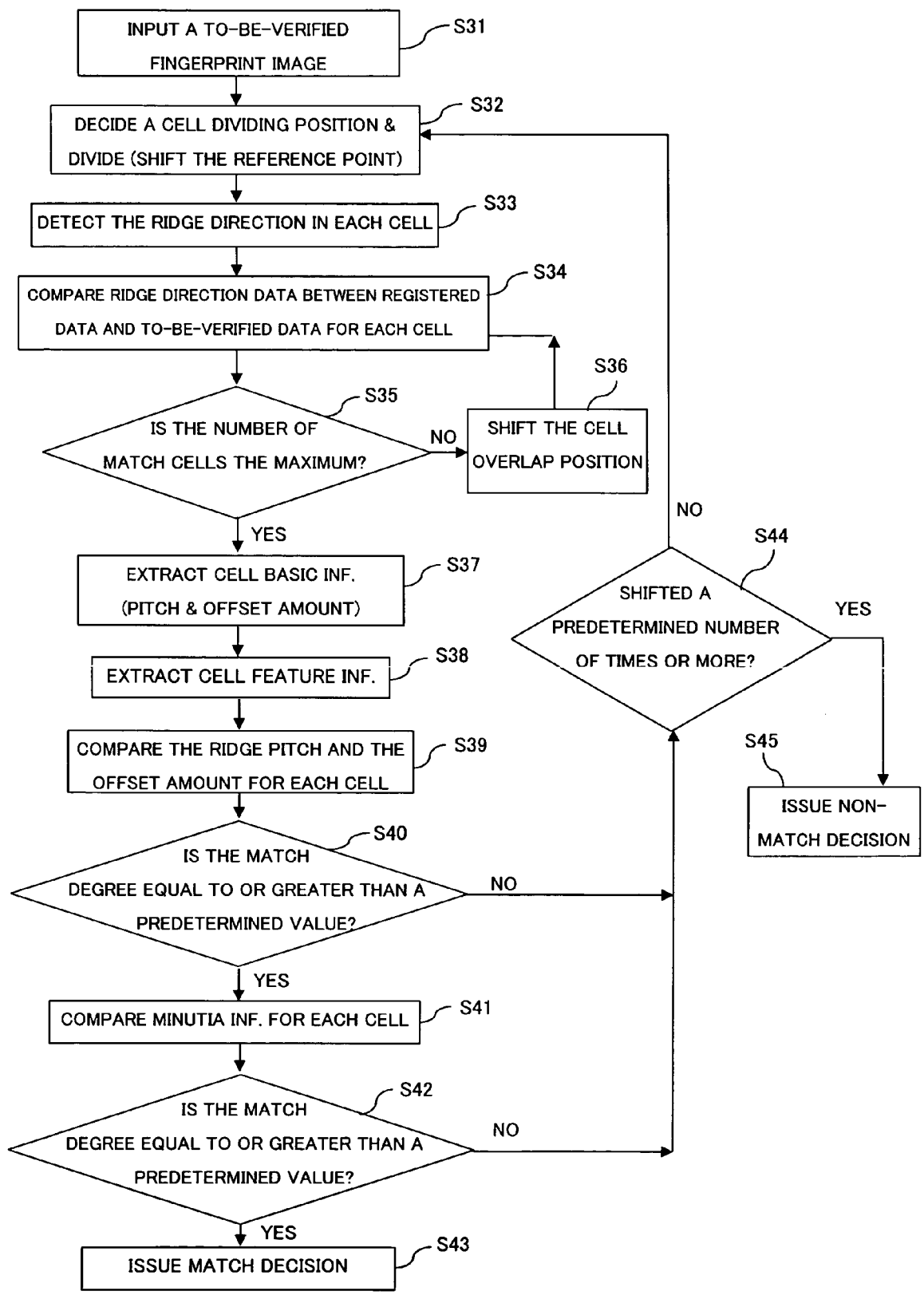
FIG. 6 is a flowchart indicating an operation of the biometric information verifying apparatus (fingerprint verifying apparatus) according to a second embodiment of the present invention.
Figure 20:
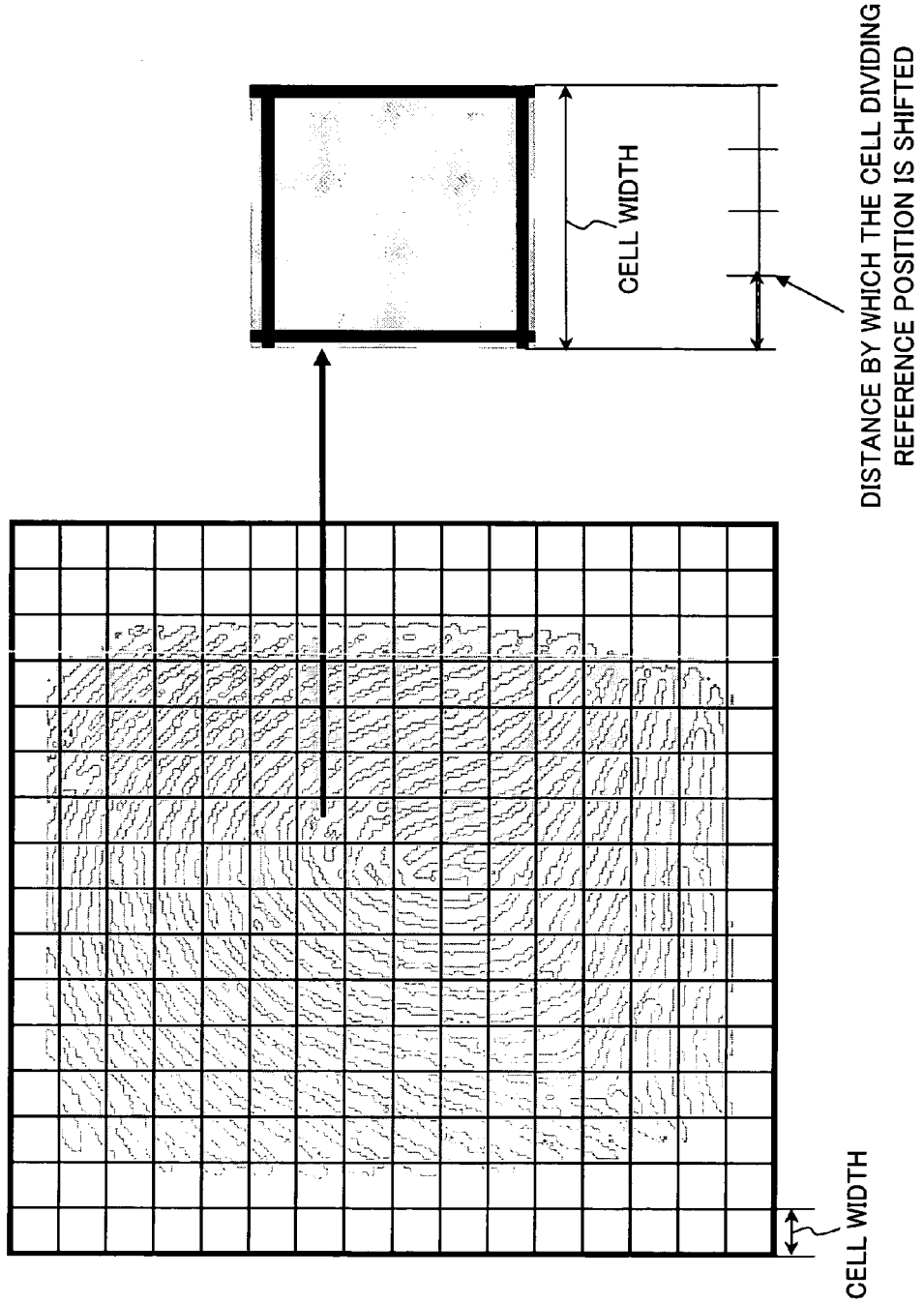
FIG. 20 is a view for use in describing a distance by which the cell division reference point is shifted.
Figure 21A:
FIG. 21A and FIG. 21B are a couple of fingerprint images which are subjected to pattern matching.
Figure 21B:
Figure 22A:
FIG. 22A through FIG. 22C are views for use in describing pattern matching procedures which are performed to compare the fingerprint images of FIG. 21A and FIG. 21B for verification.
Figure 22B:
Figure 22C:
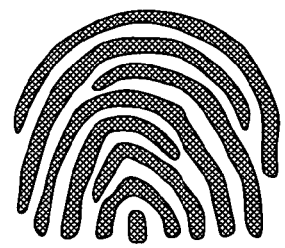
Figure 23:
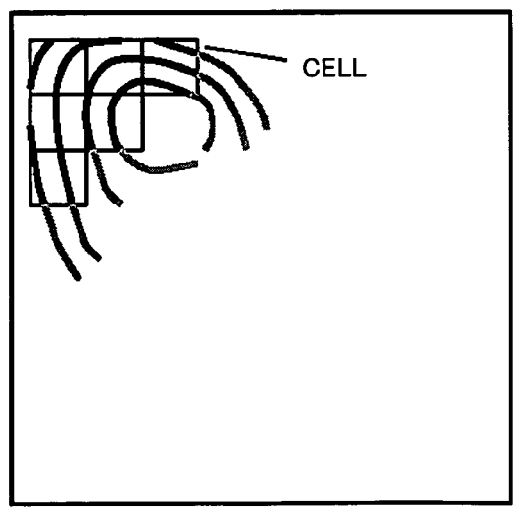
FIG. 23 is an example fingerprint image which is divided into cells.

Referring to FIG. 6, FIG. 7, and FIG. 20, a description will now be made of an operation of a biometric information verifying apparatus (fingerprint verifying apparatus) 10 of a second embodiment of the present invention. FIG. 6 is a flowchart indicating the operation; FIG. 7A and FIG. 7B are an example fingerprint image which is divided into cells and the same example fingerprint image in which a cell division reference point is shifted, respectively; FIG. 20 is a view for use in describing a distance by which the cell dividing reference position is shifted.

As shown in FIG. 6, in the fingerprint verifying apparatus 10 of the second embodiment, when a user to be verified inputs a fingerprint image (to-be-verified fingerprint image) through a fingerprint sensor 20 at user verification (step S31), the cell dividing unit 11 decides a cell dividing position and divides the input to-be-verified fingerprint image, which is input through the fingerprint sensor 20, into cells, which are the same units as the cells used at cell division performed at user enrollment (step S32). The cell basic information obtaining unit 12 then extracts and obtains ridge directions θ alone, from the fingerprint image contained in the individual cells, which are obtained by the cell dividing unit 11 (step S33).

After that, the verifying unit 14 compares the ridge directions θ of the individual cells of registered data provided by the registration data storing unit 30 with the ridge directions θ of the individual cells extracted and obtained at step S33, thereby aligning the registered fingerprint image (or registered data cells) and the to-be-verified fingerprint image (or to-be-verified data cells) (step S34 through step S36). Since step S34 through step S36 correspond to step S15 through S17 of FIG. 4, respectively, descriptions of these step S34 through step S36 are omitted here.

If cell alignment between the registered data and the to-be-verified data is performed such that the number of match cell pairs is a maximum (YES route of step S35), the cell basic information obtaining unit 12 and the cell feature information obtaining unit 13 extract and obtain cell basic information (ridge pitch λ and offset amount δ) and minutia information, as to-be-verified data, from the fingerprint image contained in the individual cells which are obtained by the cell dividing unit 11 (step S37 and step S38).

After that, the verifying unit 14 compares ridge pitches λ and offset amounts δ of corresponding cells between the registered data and the to-be-verified data (step S39), and then evaluates whether or not the comparison result satisfies a predetermined match condition (whether or not the match degree is equal to or greater than a predetermined value) (step S40).

If the match degree of the ridge pitch and that of the offset amount are equal to or greater than a predetermined value (YES route of step S40), minutia information of the corresponding cells between the registered data and the to-be-verified data is compared (step S41), and then it is evaluated whether or not the comparison result satisfies a predetermined match condition (whether or not the match degree is equal to or greater than a predetermined value) (step S42). At this time, if the minutia information includes minutia types and the number of minutia points for each minutia type, the minutia types and the number of minutia points for each minutia type are compared in the corresponding cells between the registered data and the to-be-verified data.

If the match degree of the minutia information is equal to or greater than a predetermined value (YES route of step S42), a match decision is made (step S43). That is, it is judged that the registered fingerprint image (registered data) and the to-be-verified fingerprint image (to-be-verified data) belong to the same user (fingertip).

On the other hand, if the match degree is judged to be smaller than the predetermined value at step S40 and at step S42 (NO route), the verifying unit 14 evaluates whether or not the cell division reference point was shifted a predetermined number of times or more (step S44). If the evaluation result is negative (NO route of step S44), the processing returns to step S32, and the cell division reference point in the to-be-verified fingerprint image is shifted by a predetermined amount (see FIG. 7A and FIG. 7B), and the cell dividing unit 11 divides the to-be-verified fingerprint image, input through the fingerprint sensor 20, into cells once again based on the thus-shifted cell division reference point. The cell basic information obtaining unit 12 re-extracts and reobtains ridge directions 0 alone, from the fingerprint image contained in individual cells that are obtained by the redivision by the cell dividing unit 11 (step S33). Here, as shown in FIG. 20, the distance (the abovementioned predetermined amount) by which the cell division reference point is shifted at step S32 is about one-fourth of the width (cell width) of the individual cells.

After that, as in the case of the above, the cell alignment between the registered data and the to-be-verified data is performed once again, such that the number of match cell pairs is a maximum (step S34 through step S36). The cell basic information obtaining unit 12 and the cell feature information obtaining unit 13 then re-extract and reobtain cell basic information and minutia information, respectively, from the individual cells that are obtained by the redivision (step S37 and step S38), and the verifying unit 14 compares and evaluates the registered data and the thus reobtained to-be-verified data (step S39 through step S42).

As a result of the reevaluation, if the match degree of the minutia information is judged to be equal to or greater than a predetermined value (YES route of step S42), a match decision is made (step S43). Contrarily, if the match degree is judged to be smaller than a predetermined value (NO route) at step S40 and step S42, the processing returns to step S44, and the above reprocessing is then repeated. If the cell division reference point is shifted a predetermined number of times or more (Yes route of step S44), that is, if the comparison result does not satisfy the predetermined match condition even after a predetermined number of times of repetitions of the reprocessing, a non-match decision is made (step S45). In other words, it is judged that the registered fingerprint image (registered data) and the to-be-verified fingerprint image (to-be-verified data) do not belong to the same user (fingertip).

In this manner, according to the second embodiment, not only like effects and benefits to those of the first embodiment are realized but also the following advantages are also realized. If neither the cell basic information (ridge pitch λ and offset amount δ comparison result nor the minutia information comparison result satisfies a predetermined condition, the cell division reference point of the to-be-verified fingerprint image is shifted, and the cell division, cell alignment, information acquisition, information comparison/valuation are performed once again. This will improve the accuracy of pattern matching verification between the registered data and the to-be-verified data, thereby further improving the reliability of the verification result and further reducing the false verification rate.

[3] Third Embodiment

Figure 8:
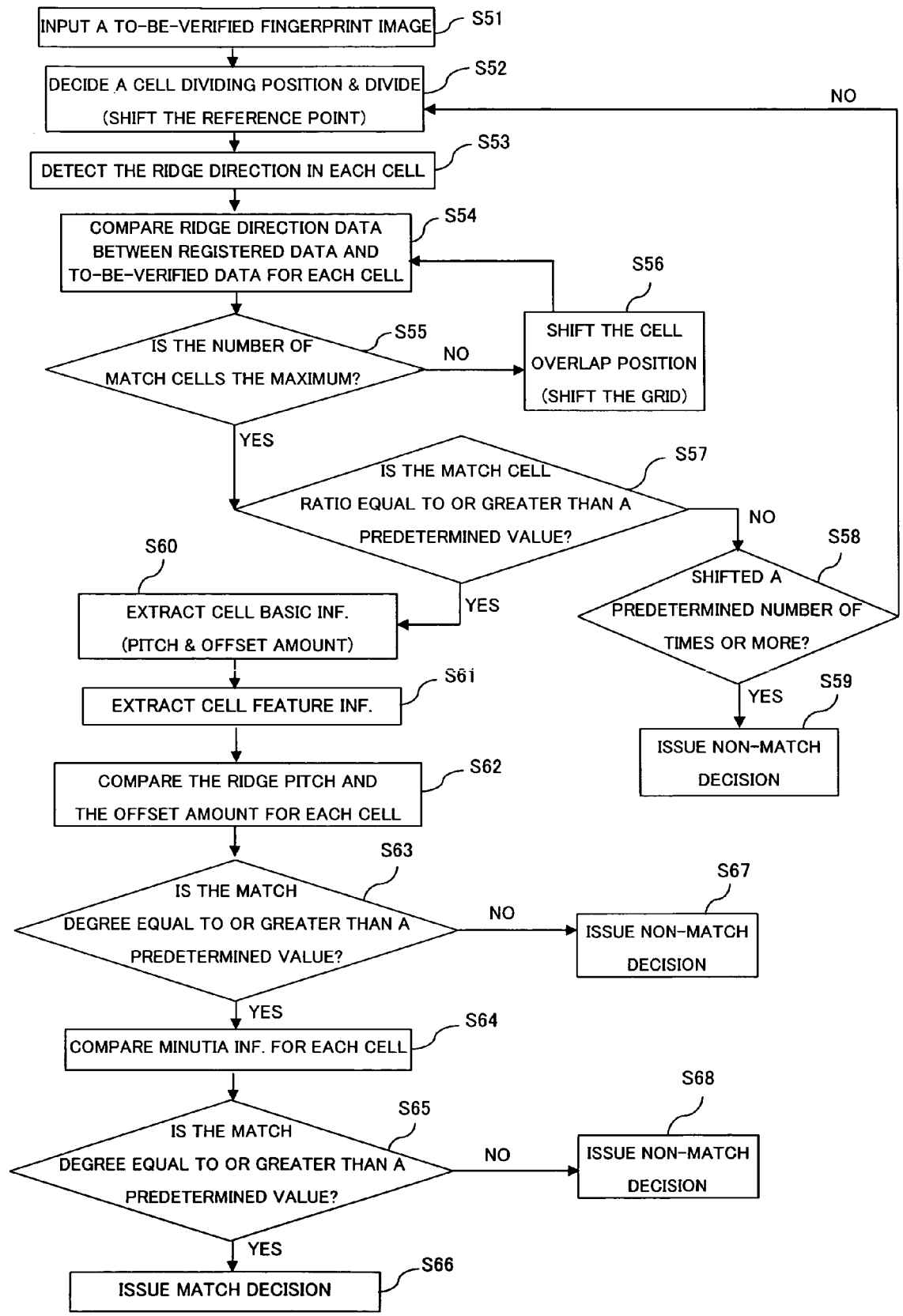
FIG. 8 is a flowchart indicating an operation of the biometric information verifying apparatus (fingerprint verifying apparatus) according to a third embodiment of the present invention.

Referring to FIG. 8, a description will now be made of an operation of a biometric information verifying apparatus (fingerprint verifying apparatus) 10 of a third embodiment of the present invention. FIG. 8 is a flowchart indicating the operation.

As shown in FIG. 8, in the fingerprint verifying apparatus 10 of the third embodiment, when a user to be verified inputs a fingerprint image (to-be-verified fingerprint image) through a fingerprint sensor 20 at user verification (step S51), the cell dividing unit 11 decides a cell dividing position and divides the input to-be-verified fingerprint image, input through the fingerprint sensor 20, into cells which are the same as the cells used at cell division performed at user enrollment (step S52). The cell basic information obtaining unit 12 then extracts and obtains ridge directions θ alone, from the fingerprint image contained in the individual cells, which are obtained by the cell dividing unit 11 (step S53).

After that, the verifying unit 14 compares the ridge directions θ of the individual cells of registered data provided by the registration data storing unit 30 with the ridge directions θ of the individual cells extracted and obtained at step S53, thereby aligning the registered fingerprint image (or registered data cells) and the to-be-verified fingerprint image (or to-be-verified data cells) (step S54 through step S56) as in the case of the first embodiment. At this time, the alignment is performed such that the number of match cell pairs, which are pairs of cells, one from the registered data and the other from the to-be-verified data, whose ridge directions θ coincide with each other, is a maximum. Here, since steps S54 through S56 correspond to steps S15 through S17 of FIG. 4, respectively, descriptions of these steps S54 through S56 are omitted here.

If cell alignment between the registered data and the to-be-verified data is performed such that the number of match cell pairs is a maximum (YES route of step S55), the verifying unit 14 evaluates whether or not the direction θ comparison result satisfies a predetermined alignment condition (step S57). In this example, the maximum number of match cell pairs serves as the direction E comparison result, and a condition that the match cell ratio (the ratio of the number of match cell pairs to the total number of cells in each of the registered data and the to-be-verified data) is equal to or greater than a predetermined value serves as the aforementioned alignment condition. Alternatively, that the maximum number of the match cell pairs is equal to or greater than a threshold can also serve as the aforementioned alignment condition.

If it is judged that the direction θ comparison result satisfies the predetermined condition at step S57, or that the match cell ratio is equal to or greater than the predetermined value (YES route), the cell basic information obtaining unit 12 and the cell feature information obtaining unit 13 extract and obtain cell basic information (ridge pitch λ and offset amount δ) and minutia information, respectively, from the fingerprint image contained in the individual cells, which are obtained by the cell dividing unit 11, as to-be-verified data (step S60 and step S61).

After that, the verifying unit 14 compares ridge pitches λ and offset amounts δ of corresponding cells between the registered data and the to-be-verified data (step S62), and evaluates whether or not the comparison result satisfies a predetermined condition (whether or not the match degree is equal to or greater than a predetermined value) (step S63).

If the match degree of the pitch pitches λ and that of the offset amounts δ are equal to or greater than the predetermined value (YES route of step S63), minutia information of the corresponding cells between the registered data and the to-be-verified data is compared (step S64) to evaluate whether or not the comparison result satisfies a predetermined match condition (whether or not the match degree is equal to or greater than a predetermined value) (step S65). At this time, if the minutia information includes minutia types and the number of minutia points for each minutia type, the minutia types and the number of minutia points for each minutia type are compared in the to-be-verified data.

If the match degree of the minutia information is equal to or greater than the predetermined value (YES route of step S65), a match decision is made (step S66). That is, it is judged that the registered fingerprint image (registered data) and the to-be-verified fingerprint image (to-be-verified data) belong to the same user (fingertip).

On the other hand, if the match degree is judged to be smaller than the predetermined value at step S63 and at step S65 (NO route), a non-match decision is made (step S67 and step S68). That is, it is judged that the registered fingerprint image (registered data) and the to-be-verified fingerprint image (to-be-verified data) do not belong to the same user (fingertip).

In the meantime, if it is judged at step S57 that the direction θ comparison result does not satisfy the predetermined alignment condition, or that the match cell ratio is smaller than the predetermined value (NO route), the verifying unit 14 evaluates whether or not the cell division reference point was shifted a predetermined number of times or more (step S58).

If the evaluation result is negative (NO route of step S58), the processing returns to step S52, and the cell division reference point in the to-be-verified fingerprint image is shifted by a predetermined amount, as in the above example already described with reference to FIG. 7A, FIG. 7B, and FIG. 20, and the cell dividing unit 11 redivides the to-be-verified fingerprint image, input through the fingerprint sensor 20, into cells based on the thus-shifted cell division reference point. The cell basic information obtaining unit 12 then re-extracts and reobtains ridge directions θ alone, from the fingerprint image contained in individual cells that are obtained by the redivision by the cell dividing unit 11 (step S53). After that, the cell alignment between the registered data and the to-be-verified data is performed once again, such that the number of match cell pairs is a maximum (step S54 through step S56), and the verifying unit 14 reevaluates whether or not the direction θ comparison result satisfies a predetermined alignment condition (step S57).

As a result of the reevaluation, if it is judged that the direction θ comparison result does not satisfy the predetermined alignment condition (NO route of step S57), the processing returns to step S58 once again, and the above reprocessing is then repeated. If the cell division reference point is shifted a predetermined number of times or more (Yes route of step S58), that is, if the comparison result does not satisfy the predetermined match condition even after a predetermined number of times of repetitions of the reprocessing, a non-match decision is made (step S59), in a similar manner to the procedures of step S67 and step S68.

As a result of the reevaluation at step S57, if it is judged that the direction θ comparison result satisfies the predetermined alignment condition (YES route), the cell basic information obtaining unit 12 and the cell feature information obtaining unit 13 extract and obtain cell basic information (ridge pitch λ and offset amount δ) and minutia information, respectively, as to-be-verified data, from the individual cells that are obtained by the redivision (step S60 and step S61), and the verifying unit 14 performs comparison and evaluation in a similar to the above description (step S62 through step S65), and makes a match (step S66) or a non-match (step S67 and step S68) decision.

In this manner, according to the third embodiment, not only like effects and benefits to those of the first embodiment are realized but also the following advantages are realized. Since the cell alignment between the registered data and the to-be-verified data by use of the direction θ of each cell is repeated until the predetermined alignment condition is satisfied, it is possible to make a match/non-match decision based on the cell basic information (ridge pitch λ and offset amount δ) and the minutia information under a condition where the registered data cells and the to-be-verified data cells are aligned with higher accuracy. This will improve the reliability of the verification result and also reduce the false verification rate.

In the above third embodiment, if the match degree is smaller than a predetermined value (NO route) at step S63 and step S65, a non-match decision is immediately made at step S67 and step S68. However, after such evaluation at step S63 and step S65, the procedures of step S52 through step S66 can be performed once again after shifting of the cell division reference point by a predetermined amount, in a similar manner to the second embodiment as shown in FIG. 6.

At that time, the verifying unit 14 compares cell basic information (ridge pitch λ and offset amount δ) and minutia information of corresponding cells between the registered data and the to-be-verified data reobtained at step S60 and step S61 (step S62 and step S64), and reevaluates whether or not the match degree of the comparison result is equal to or greater than a predetermined value (step S63 and step S65) If the match degree still remains smaller than the predetermined value even after a predetermined number of times of repetitions of such reprocessing, the verifying unit 14 eventually issues a non-match decision.

With this arrangement, as in the case of the second embodiment, if neither the cell basic information (ridge pitch λ and offset amount δ) comparison result nor the minutia information comparison result for the individual cells satisfies the predetermined condition, the cell division reference point of the to-be-verified fingerprint image is shifted, and the cell division, cell alignment, information acquisition, and information comparison/valuation are performed once again. This will improve the accuracy of pattern matching verification between the registered data and the to-be-verified data, thereby further improving the reliability of the verification result and further reducing the false verification rate.

Figure 9:
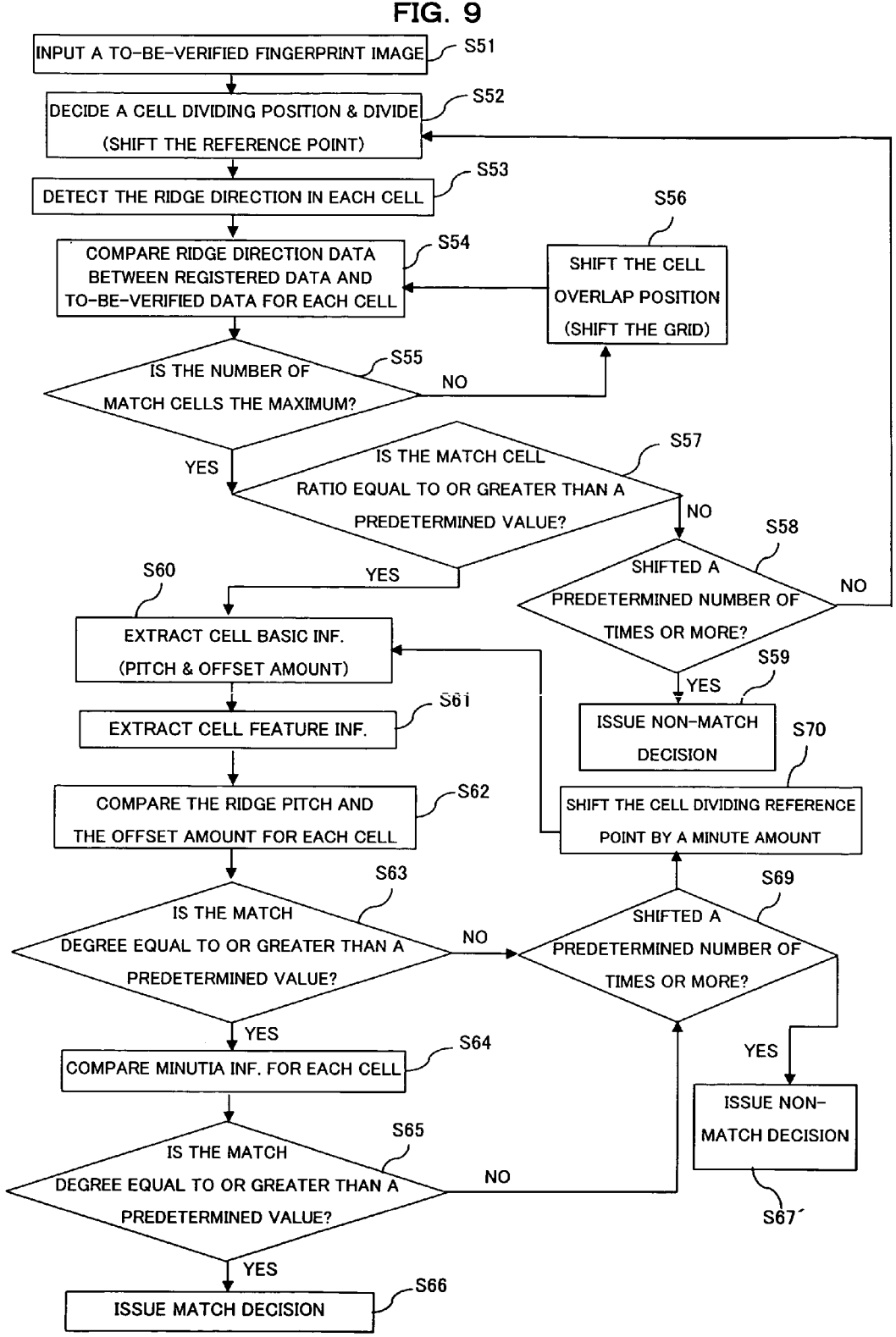
FIG. 9 is a flowchart indicating an operation of the biometric information verifying apparatus (fingerprint verifying apparatus) according to a modified example of the third embodiment.

FIG. 9 shows a flowchart indicating a modified example of the operation of the biometric information verifying apparatus (fingerprint verifying apparatus) according to the third embodiment. In the modified example of the third embodiment of FIG. 9, the verification procedures are basically the same as those of the third embodiment of FIG. 8, but the difference lies in that, if the match degree is judged to be smaller than a predetermined value at step S63 and step S65, the verifying unit 14 evaluates whether or not minute-amount shifting of the cell division reference point was performed a predetermined number of times or more (step S69).

If the evaluation result is negative (NO route of step S69), the cell division reference point of the to-be-verified fingerprint image is shifted by a predetermined minute amount, which is smaller than the foregoing predetermined amount (the shift width of FIG. 20) (minute shifting of the cell division reference point; step S70), and then the procedures of step S60 through step S66 are performed once again.

Here, at step S70, the alignment result obtained by step S52 through step S57 is maintained, that is, while keeping the association between the registered data cells and the to-be-verified data cells obtained by the alignment processing, the cells (grid) of the to-be-verified data are shifted by the foregoing predetermined minute amount.

After that, at step S60 and step S61, cell feature information (ridge pitch λ and offset amount δ) and minutia information are extracted and obtained from the thus minute-amount shifted cells (grid), and the verifying unit 14 compares the cell feature information and the minutia information of corresponding cells between the registered data and the reobtained to-be-verified data at step S60 and step S61 (step S62 and step S64), and evaluates whether or not the match degrees of the comparison results at step S63 and step S65 are equal to or greater than a predetermined value. If the match degrees still remain smaller than the predetermined value even after a predetermined number of times of repetitions of such reprocessing, the verifying unit 14 issues a non-match decision (step S67').

With this arrangement, as in the case of the second embodiment, if neither the cell basic information (ridge pitch λ and offset amount δ) comparison result nor the minutia information comparison result for the individual cells satisfies the predetermined condition, the cell division reference point of the to-be-verified fingerprint image is shifted by a minute amount, and the cell division, cell alignment, information acquisition, information comparison/valuation are performed once again. This will improve the accuracy of pattern matching verification between the registered data and the to-be-verified data, thereby further improving the reliability of the verification result and further reducing the false verification rate.

[4] Fourth Embodiment

Figure 10:
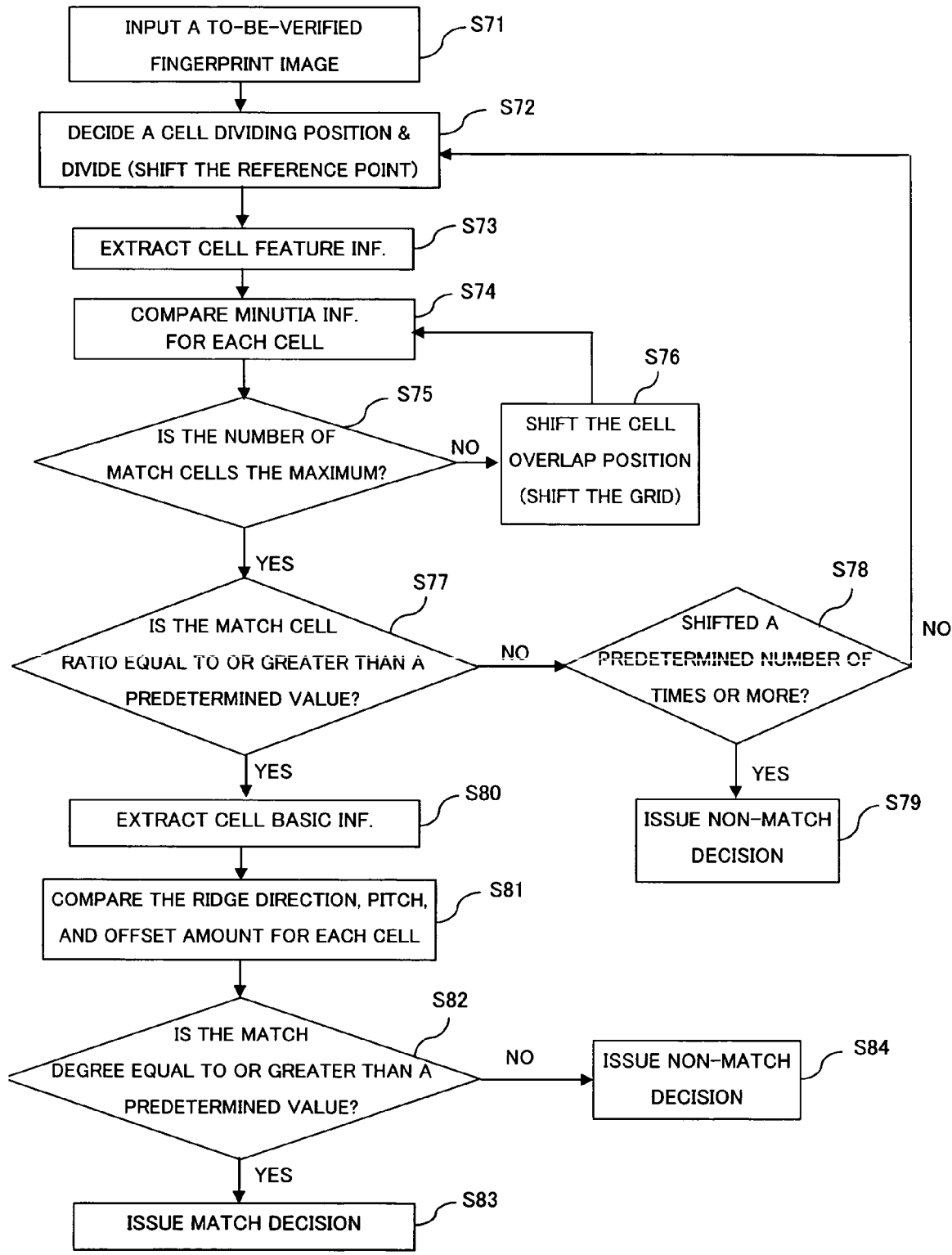
FIG. 10 is a flowchart indicating an operation of the biometric information verifying apparatus (fingerprint verifying apparatus) according to a fourth embodiment of the present invention.
Figure 11:
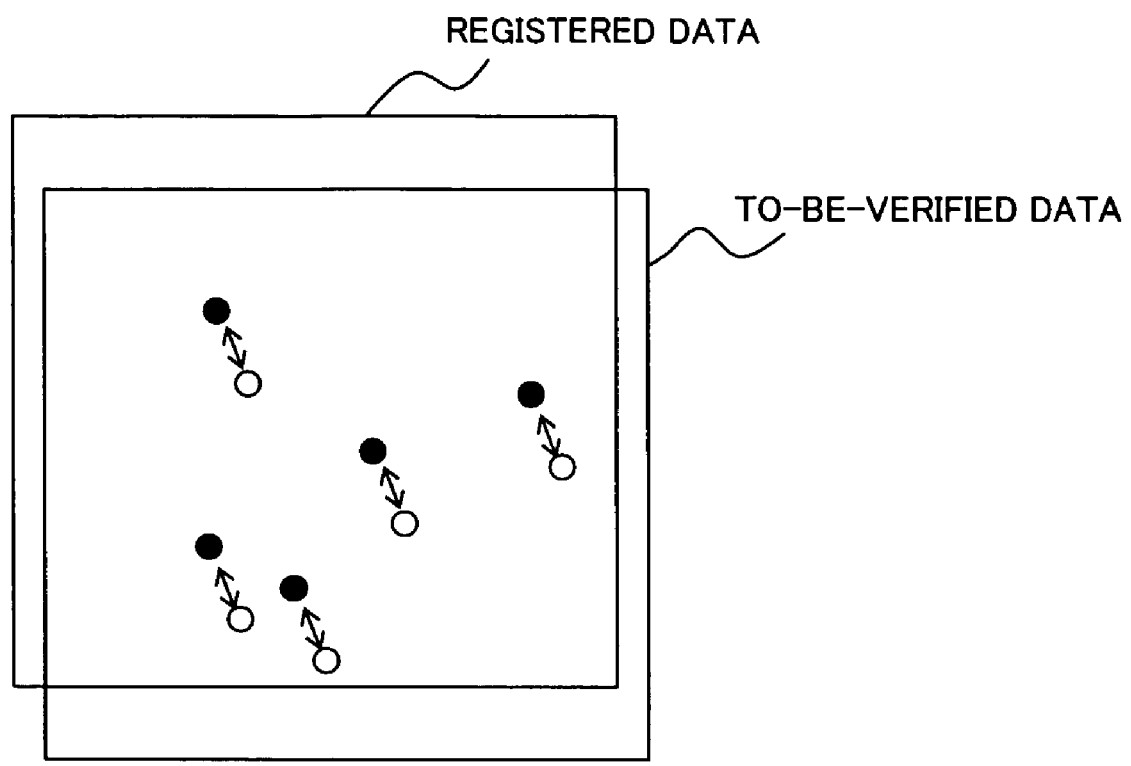
FIG. 11 is a view for use in describing image alignment based on ridge direction data obtained from each cell.

Referring to FIG. 10 and FIG. 11, a description will now be made of an operation of a biometric information verifying apparatus (fingerprint verifying apparatus) 10 of a fourth embodiment of the present invention. FIG. 10 is a flowchart indicating the operation; FIG. 11 is a view for use in describing cell alignment which is performed on the basis of minutia information.

As shown in FIG. 10, in the fingerprint verifying apparatus 10 of the fourth embodiment, when a user to be verified inputs a fingerprint image (to-be-verified fingerprint image) through a fingerprint sensor 20 at user verification (step S71), the cell dividing unit 11 decides a cell dividing position and divides the input to-be-verified fingerprint image, which is input through the fingerprint sensor 20, into cells which are the same as the cells used at cell division performed at user enrollment (step S72). The cell feature information obtaining unit 13 extracts and obtains ridge minutia information (cell feature information) from the fingerprint image contained in the individual cells, which are obtained by the cell dividing unit 11 (step S73).

After that, the verifying unit 14 compares the minutia information of the individual cells of registered data provided by the registration data storing unit 30 with the minutia information of the individual cells extracted and obtained at step S73, thereby aligning the registered fingerprint image (or registered data cells) and the to-be-verified fingerprint image (or to-be-verified data cells) (step S74 through step S76), as shown in FIG. 11. At this time, the alignment is performed, such that the number of match cell pairs, which are pairs of cells, one from the registered data and the other from the to-be-verified data, whose minutia information coincides, is a maximum.

More concretely, the registered data cells and the to-be-verified data cells are superposed to compare their minutia information (step S74), and then evaluates whether or not the number of match cell pairs is a maximum (step S75). If the evaluation is negative (NO route of step S75), the cell alignment position is shifted (that is, the grid is shifted; step S76), and the processing then returns to step S74, and the minutia information comparison is performed once again. These procedures are repeated until the number of match cell pairs is judged to be a maximum (YES decision is made) at step S75. Here, the evaluation at step S75 can be made on "whether or not the match cell ratio is equal to or greater than a predetermined value", instead on "whether or not the number of match cell pairs is a maximum". In this case, the image alignment is performed, such that the match cell ratio (the ratio of the number of match cells to the total number of cells) is equal to or greater than a predetermined value.

If the registered data cells and the to-be-verified data cells are aligned such that the number of match cell pairs is a maximum (YES route of step S75), the verifying unit 14 evaluates whether or not the minutia information comparison result satisfies a predetermined alignment condition (step S77). Here, the maximum number of the match cell pairs serves as the comparison result, and a condition that a match cell ratio, which is a ratio of the number of match cell pairs to the total number of cells in the registered data or the to-be-verified data, is equal to or greater than a predetermined value serves as the aforementioned predetermined alignment condition. Alternatively, a condition where the maximum number is equal to or greater than a predetermined threshold can also serve as the predetermined alignment condition.

If the minutia information comparison result satisfies the predetermined alignment condition at step S77, that is, if the match cell ratio is equal to or greater than the predetermined value (YES route), the cell basic information obtaining unit 12 extracts and obtains cell basic information (ridge direction θ, ridge pitch λ, and offset amount δ) from the fingerprint image contained in the individual cells, which are obtained by the cell dividing unit 11, as to-be-verified data (step S80).

After that, the verifying unit 14 compares ridge directions θ, ridge pitches λ, and offset amounts δ of corresponding cells between the registered data and the to-be-verified data (step S81), and then evaluates whether or not the comparison result satisfies a predetermined match condition (whether or not the match degree is equal to or greater than a predetermined value) (step S82).

If the match degree of the pitch λ and that of the offset amount δ are equal to or greater than a predetermined value (YES route of step S82), a match decision is made (step S83). That is, it is judged that the registered fingerprint image (registered data) and the to-be-verified fingerprint image (to-be-verified data) belong to the same user (fingertip).

On the other hand, if it is judged that the match degree is smaller than the predetermined value at step S82 and (NO route), a non-match decision is made (step S84). That is, it is judged that the registered fingerprint image (registered data) and the to-be-verified fingerprint image (to-be-verified data) do not belong to the same user (fingertip).

In the meantime, if it is judged at step S77 that the minutia comparison result does not satisfy the predetermined alignment condition, or that the match cell ratio is smaller than the predetermined value (NO route), the verifying unit 14 evaluates whether or not the cell division reference point was shifted a predetermined number of times or more (step S78).

If the number of times the cell division reference point was shifted is smaller than a predetermined value (NO route of step S78), the processing returns to step S72. The cell division reference point in the to-be-verified fingerprint image is shifted by a predetermined amount, as in the above example already described with reference to FIG. 7A, FIG. 7B, and FIG. 20, and the cell dividing unit 11 redivides the to-be-verified fingerprint image, input through the fingerprint sensor 20, into cells based on the thus-shifted cell division reference point. The cell feature information obtaining unit 13 extracts and obtains ridge minutia information from the fingerprint image contained in the individual cells, which are obtained by the cell dividing unit 11 (step S73). After that, the registered data cells and the to-be-verified data cells are aligned, such that the number of match cell pairs, which are pairs of cells, one from the registered data and the other from the to-be-verified data, having identical minutia information, is a maximum (step S74 through step S76), and the verifying unit 14 evaluates once again whether or not the minutia information comparison result satisfies a predetermined alignment condition (step S77).

As a result of the reevaluation, if it is judged that the minutia information comparison result does not satisfy the predetermined alignment condition (NO route of step S77), the processing returns to step S78 once again, and the above reprocessing is then repeated. If the cell division reference point is shifted a predetermined number of times or more (Yes route of step S78), that is, if the comparison result does not satisfy the predetermined match condition even after a predetermined number of times of repetitions of the reprocessing, a non-match decision is made (step S79), as in the case of step S84.

As a result of the reevaluation at step S77, if it is judged that the minutia information comparison result satisfies the predetermined alignment condition (YES route of step S77), the cell basic information obtaining unit 12 extracts and obtains cell basic information (ridge direction θ, ridge pitch λ, and offset amount δ) from the individual cells that are obtained by the redivision by the cell dividing unit 11 (step S80), and the verifying unit 14 then performs comparison and evaluation similar to the above description (step S81 and step S82), and makes a match (step S83) or a non-match (step S84) decision.

In this manner, according to the fourth embodiment, not only like effects and benefits to those of the first embodiment are realized but also the following advantages are also realized. Since the cell alignment between the registered data and the to-be-verified data by use of the minutia information of each cell is repeated until the predetermined alignment condition is satisfied, it is possible to make a match/non-match decision based on the cell basic information (ridge direction θ, ridge pitch λ, and offset amount δ) and the minutia information, under a condition where the registered data cells and the to-be-verified data cells are aligned with higher accuracy. This will improve the reliability of the verification result and also reduce the false verification rate.

In the above fourth embodiment, if the match degree is smaller than a predetermined value (NO route) at step S82, a non-match decision is immediately made at step S84. Alternatively, after such evaluation at step S82, the procedures of step S72 through step S83 can be performed once again after shifting of the cell division reference point by a predetermined amount, as in the case of the second embodiment as shown in FIG. 6.

At that time, the verifying unit 14 compares cell basic information (ridge direction θ, ridge pitch λ, and offset amount δ) of corresponding cells between the registered data and the to-be-verified data reobtained at step S80 (step S81), and reevaluates whether or not the match degree of the comparison result is equal to or greater than a predetermined value (step S82). If the match degree still remains smaller than the predetermined value even after a predetermined number of times of repetitions of such reprocessing, the verifying unit 14 eventually issues a non-match decision.

With this arrangement, as in the case of the second embodiment, if the cell basic information (ridge direction θ, ridge pitch λ, and offset amount δ) comparison result in the individual cells does not satisfy the predetermined condition, the cell division reference point of the to-be-verified fingerprint image is shifted, and the cell division, cell alignment, information acquisition, and information comparison/valuation are performed once again. This will improve the accuracy of pattern matching verification between the registered data and the to-be-verified data, thereby further improving the reliability of the verification result and further reducing the false verification rate.

[5] Fifth Embodiment

Figure 12:
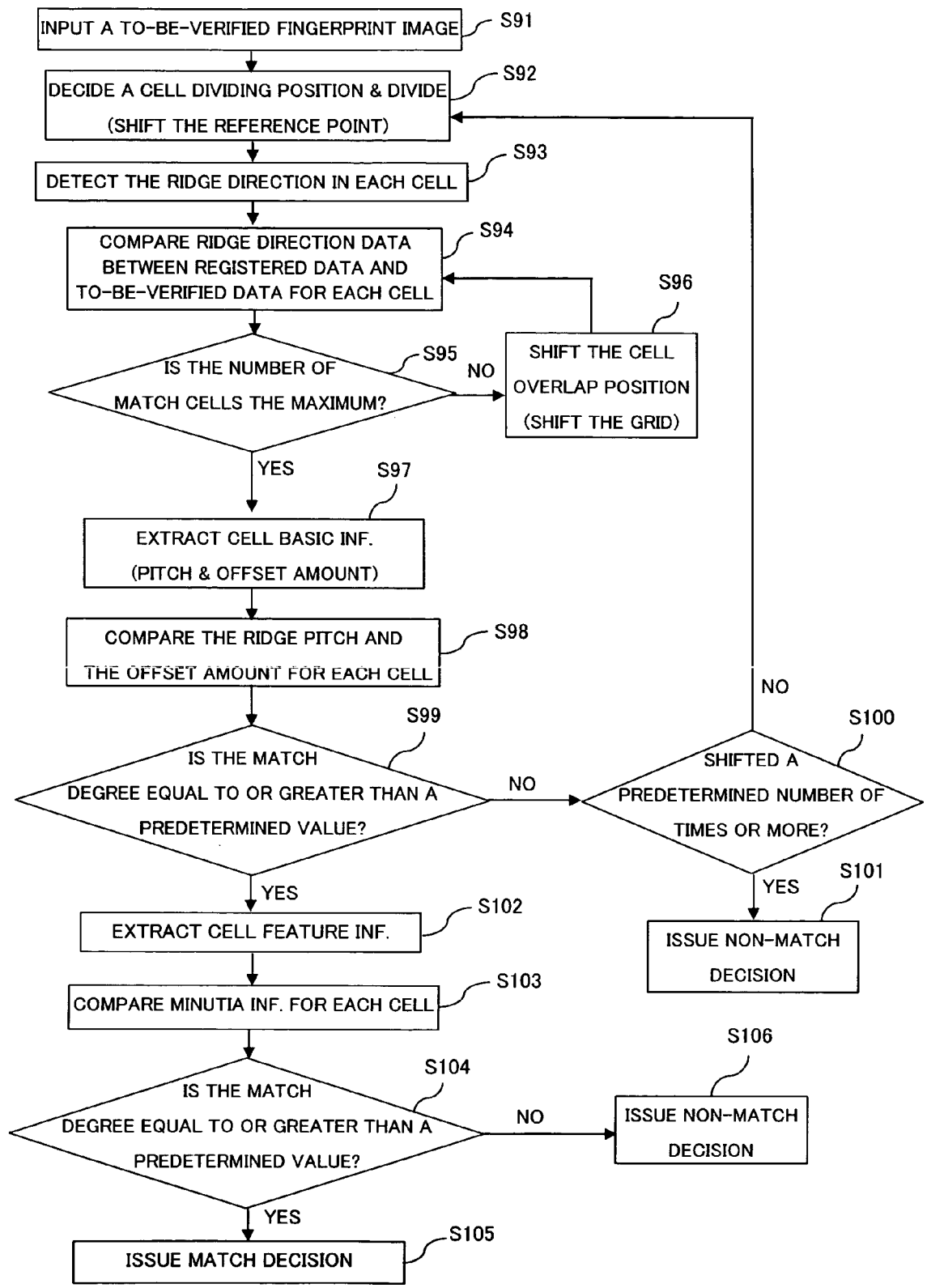
FIG. 12 is a flowchart indicating an operation of the biometric information verifying apparatus (fingerprint verifying apparatus) according to a fifth embodiment of the present invention.

Referring to FIG. 12, a description will now be made of an operation of a biometric information verifying apparatus (fingerprint verifying apparatus) 10 of a fifth embodiment of the present invention. FIG. 12 is a flowchart indicating the operation.

As shown in FIG. 12, in the fingerprint verifying apparatus 10 of the fifth embodiment, when a user inputs a fingerprint image (to-be-verified fingerprint image) through a fingerprint sensor 20 at user verification (step S91), the cell dividing unit 11 decides a cell dividing position and divides the input to-be-verified fingerprint image, which is input through the fingerprint sensor 20, into cells which are the same as the cells used at cell division performed at user enrollment (step S92). The cell basic information obtaining unit 12 then extracts and obtains ridge directions θ alone, from the fingerprint image contained in the individual cells that are obtained as a result of redivision by the cell dividing unit 11 (step S93).

After that, the verifying unit 14 compares the ridge directions θ of the individual cells of registered data provided by the registration data storing unit 30 with the ridge directions θ of the individual cells extracted and obtained at step S93, thereby aligning the registered fingerprint image (or registered data cells) and the to-be-verified fingerprint image (or to-be-verified data cells) (step S94 through step S96). Since steps S94 through S96 correspond to steps S15 through S17 of FIG. 4, respectively, descriptions of these steps S94 through S96 are omitted here.

If cell alignment between the registered data and the to-be-verified data is performed such that the number of match cell pairs is a maximum (YES route of step S95), the cell basic information obtaining unit 12 extracts and obtains cell basic information (ridge pitch λ and offset amount δ), as to-be-verified data, from the fingerprint image contained in the individual cells which are obtained by the cell dividing unit 11 (step S97). The verifying unit 14 then compares ridge pitches λ and offset amounts δ of corresponding cells between the registered data and the to-be-verified data (step S98), and evaluates whether or not the comparison result satisfies a predetermined match condition (a predetermined alignment condition) (whether or not the match degree is equal to or greater than a predetermined value) (step S99).

If match degrees of the ridge pitch λ and the offset amount δ are equal to or greater than a predetermined value (YES route of step S99), the cell feature information obtaining unit 13 extracts and obtains minutia information, as to-be-verified data, from the fingerprint image contained in the individual cells which are obtained by the cell dividing unit 11 (step S102), and minutia information of the corresponding cells between the registered data and the to-be-verified data are compared (step S103), and it is then evaluated whether or not the comparison result satisfies a predetermined match condition (whether or not the match degree is equal to or greater than a predetermined value) (step S104). At this time, if the minutia information includes the number of minutia points for each minutia type, the minutia types and the number of minutia points for each minutia type are compared in the corresponding cells between the registered data and the to-be-verified data.

If the match degree of the minutia information is equal to or greater than a predetermined value (YES route of step S104), a match decision is made (step S105). That is, it is judged that the registered fingerprint image (registered data) and the to-be-verified fingerprint image (to-be-verified data) belong to the same user (fingertip).

On the other hand, if it is judged that the match degree is smaller than the predetermined value at step S104 (NO route), a non-match decision is made (step S106). That is, it is judged that the registered fingerprint image (registered data) and the to-be-verified fingerprint image (to-be-verified data) do not belong to the same user (fingertip).

In the meantime, if it is judged at step S99 that the ridge pitch λ and offset amount δ comparison result does not satisfy the predetermined alignment condition, that is, the match degree of the pitch λ and that of the offset amount δ are smaller than the predetermined value (NO route), the verifying unit 14 evaluates whether or not the cell division reference point was shifted a predetermined number of times or more (step S100).

If the evaluation result is negative (NO route of step S100), the processing returns to step S92. The cell division reference point in the to-be-verified fingerprint image is shifted by a predetermined amount, as is already described with reference to FIG. 7A, FIG. 7B, and FIG. 20, and the cell dividing unit 11 redivides the to-be-verified fingerprint image, input through the fingerprint sensor 20, into cells based on the thus-shifted cell division reference point. The cell basic information obtaining unit 12 then re-extracts and reobtains ridge directions θ alone, from the fingerprint image contained in individual cells that are obtained by the redivision by the cell dividing unit 11 (step S93). After that, the cell alignment between the registered data and the to-be-verified data is performed once again, such that the number of direction θ match cell pairs is a maximum (step S94 through step S96), and the cell basic information obtaining unit 12 re-extracts and reobtains cell basic information (ridge pitch λ and offset amount δ) from the fingerprint image contained in the individual cells that are obtained by the redivision by the cell dividing unit 11 (step S97). The verifying unit 14 then compares once again the ridge pitches λ and the offset amounts δ of corresponding cells between the registered data and the reobtained to-be-verified data (step S98), and reevaluates whether or not the comparison result satisfies a predetermined match condition (step S99).

As a result of the reevaluation, if it is judged that the ridge pitch λ and offset amount δ comparison result does not satisfy the predetermined alignment condition (NO route of step S99), the processing returns to step S100 once again, and the above reprocessing is then repeated. If the cell division reference point is shifted a predetermined number of times or more (Yes route of step S100), that is, if the comparison result does not satisfy the predetermined match condition even after a predetermined number of times of repetitions of the reprocessing, a non-match decision is made (step S101), as in the case of step S106.

As a result of the reevaluation at step S99, if it is judged that the ridge pitch λ and offset amount δ comparison result satisfies the predetermined alignment condition (YES route), the cell feature information obtaining unit 13 extracts and obtains minutia information, as to-be-verified data, from the individual cells that are obtained by the redivision (step S102), and the verifying unit 14 performs comparison and evaluation in a similar manner to the above description (step S103 and step S104), and makes a match (step S105) or a non-match (step S106) decision.

In this manner, according to the fifth embodiment, the cell alignment between the registered data and the to-be-verified data is repeated, using the direction θ, ridge pitch λ, and offset amount δ of each cell, until the predetermined alignment condition is satisfied. Therefore, it is possible to make a match/non-match decision based on the minutia information under a condition where the registered data cells and the to-be-verified data cells are aligned with higher accuracy. This will improve the reliability of the verification result and also reduce the false verification rate.

Further, in the fifth embodiment, if the alignment cannot be performed in such a way that the cell basic information (direction θ, ridge pitch λ, and offset amount δ) satisfies the predetermined alignment condition, a non-match decision is made, and the verification procedures end, without extracting/obtaining minutia information from the to-be-verified fingerprint image. The minutia information is extracted/obtained only after such alignment is available (that is, until the cell basic information comparison result satisfies a predetermined match condition, so that a match decision is made at the cell basic information-employed verification), and the minutia information-employed verification is then carried out.

Generally speaking, binarizing and thinning process needs to be performed at extracting/obtaining minutia information, which increases processing load and processing time. In view of this, the cell basic information-based evaluation is performed preceding the minutia information-based evaluation in the fifth embodiment. In this case, if a non-match decision is available by use of only cell basic information, without the necessity of using minutia information, the verification procedures end without extracting any minutia information, so that the load of the verification process is reduced, thereby greatly decreasing the time required to complete the process. Then, if the preceding cell basic information-based evaluation leads a predetermined match result, minutia information is extracted, and verification is then performed using the extracted minutia information, thereby realizing like effects and benefits to those of the first embodiment.

In the fifth embodiment, if the match degree is judged to be smaller than a predetermined value at step S104 (NO route), a non-match decision is immediately made at step S106. Alternatively, after such evaluation at step S104, the procedures of step S92 through step S105 can be performed once again after shifting of the cell division reference point by a predetermined amount, as in the case of the second embodiment as shown in FIG. 6.

At that time, the verifying unit 14 compares minutia information of corresponding cells between the registered data and the to-be-verified data reobtained at step S102 (step S103), and reevaluates whether or not the match degree of the comparison result is equal to or greater than a predetermined value (step S104). If the match degree still remains smaller than the predetermined value even after a predetermined number of times of repetitions of such reprocessing, the verifying unit 14 eventually issues a non-match decision.

With this arrangement, as in the case of the second embodiment, if the minutia information comparison result for the individual cells does not satisfy the predetermined conditions, the cell division reference point of the to-be-verified fingerprint image is shifted, and the cell division, cell alignment, information acquisition, and information comparison/valuation are performed once again. This will improve the accuracy of pattern matching verification between the registered data and the to-be-verified data, thereby further improving the reliability of the verification result and further reducing the false verification rate.

[6] Sixth Embodiment

Figure 13:
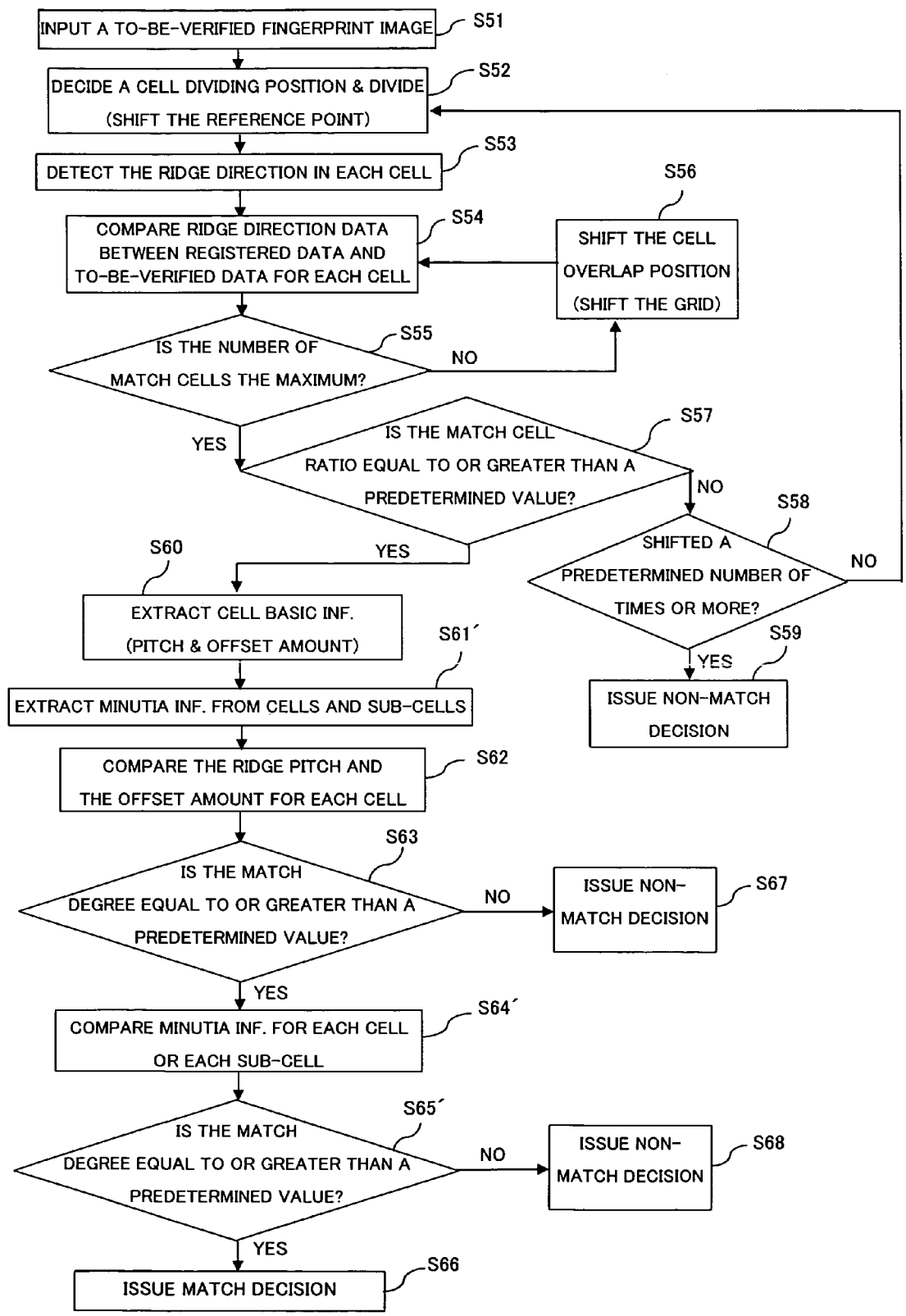
FIG. 13 is a flowchart indicating an operation of the biometric information verifying apparatus (fingerprint verifying apparatus) according to a sixth embodiment of the present invention.
Figures 14, 15:
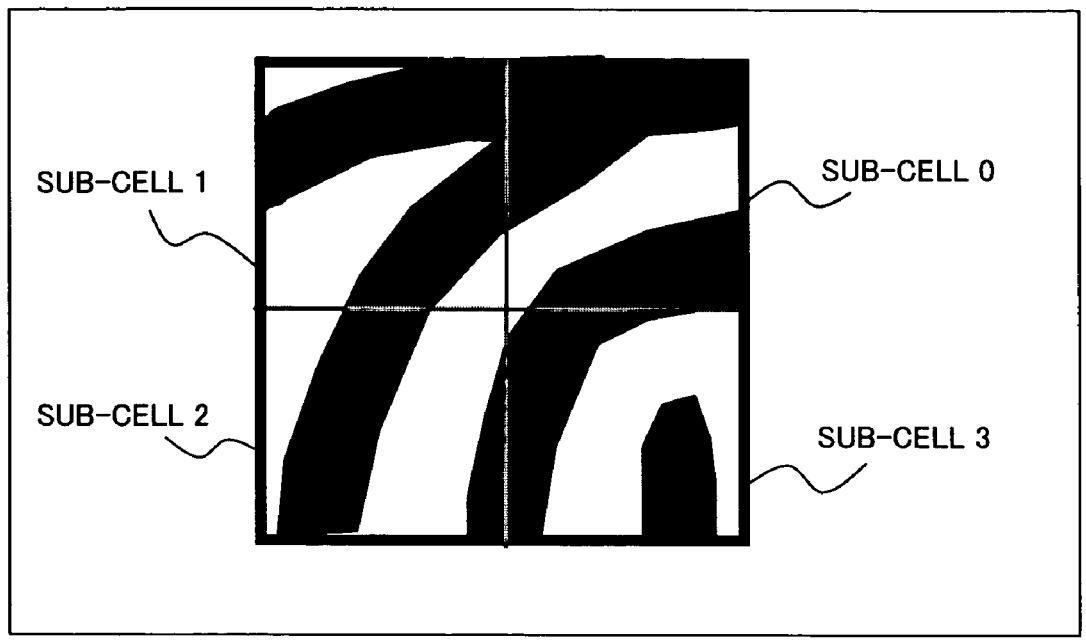
FIG. 14 is a view showing an example cell which is divided into sub-cells.
FIG. 15 is a table showing an example format of minutia information (cell feature information) obtained and stored in an application of the sub-cells of FIG. 14.

Referring to FIG. 13 through FIG. 15, a description will now be made of an operation of a biometric information verifying apparatus (fingerprint verifying apparatus) 10 of a sixth embodiment of the present invention. FIG. 13 is a flowchart indicating the operation; FIG. 14 is a view showing an example cell which is divided into sub-cells; FIG. 15 is a table showing an example format of minutia information (cell feature information) obtained and stored at application of the sub-cells of FIG. 14.

In accordance with the sixth embodiment, when minutia information (cell feature information) is extracted/obtained from individual cells as registered data or to-be-verified data, each individual cell is divided into four sub-cells 0 through 3, from which minutia information is separately extracted/obtained. The minutia information extracted from the individual sub-cells can include information about the presence or absence of any fingerprint minutia in the sub-cells, or the types (bifurcations and ridge endings) of fingerprint minutiae and the number of minutia points for each minutia type contained in the individual sub-cells.

When employing information about the presence or absence of a minutia point in each sub-cell as the minutia information, 1-bit minutia information indicating the presence or absence of a fingerprint minutia is obtained from the individual sub-cells as data to be registered, and is stored in the registration data storing unit 30. That is, 4-bit minutia information is extracted/obtained for each cell. For example, as shown in FIG. 14, when sub-cells 1 and 2 of an object cell contain no minutia points while sub-cells 0 and 3 contain some minutia points, "1001" is stored as the 4-bit minutia information of the object cell. This 4-bit minutia information is a string of minutia presence/absence information ("1" and "0" indicate the presence and the absence, respectively, of any minutia point) in sub-cells 0, 1, 2, and 3, arranged in this order.

As shown in FIG. 15, when employing, as the minutia information, information about minutia types in individual sub-cells and the number of minutia points for each minutia type in the individual sub-cells, 2-bit bifurcation number information and 2-bit ridge ending number information, for example, are stored as registered data. More concretely, the following 2-bit bifurcation number information and 2-bit ridge ending number information are extracted and stored in the following order: 2-bit bifurcation (Sc0_Mk0_Mn) number information and 2-bit ridge ending (Sc0_Mk1_Mn) number information in sub-cell 0; 2-bit bifurcation (Sc1_Mk0_Mn) number information and 2-bit ridge ending (Sc1_Mk1_Mn) number information in sub-cell 1; 2-bit bifurcation (Sc2_Mk0_Mn) number information and 2-bit ridge ending (Sc2_Mk1_Mn) number information in sub-cell 2; 2-bit bifurcation (Sc3_Mk0_Mn) number information and 2-bit ridge ending (Sc3_Mk1_Mn) number information in sub-cell 3. In other words, 2-byte minutia information is extracted and stored for each cell. Here, as in the case of the format of FIG. 3, the 2-bit number information for each minutia type is as follows: "00" indicates the number of 0; "01" indicates the number of 1; "10" indicates the number of 2; "11" indicates "unknown (unknown quantity or greater than 2)". For instance, in the cell of FIG. 14, sub-cell 0 contains one bifurcation; sub-cells 1 and 2 contains no minutia points; sub-cell 3 contains one ridge ending. Thus, 2-byte minutia information of the cell is "0100000000000001".

When such sub-cells are employed in minutia information extraction, the cell feature information obtaining unit 13 of the fingerprint verifying apparatus 10 of the sixth embodiment divides each cell of the to-be-verified fingerprint image into four sub-cells, which correspond to sub-cells of the registered data, and obtains minutia information from the individual sub-cells. The minutia information extracted here can be either the presence/absence of a minutia point or the types and the number of minutia points, as far as the extracted information items are the same as those of the registered data stored in the data storing unit 30. Further, when comparing minutia information of corresponding cells between the registered data and the to-be-verified data, the verifying unit 14 of the fingerprint verifying apparatus 10 of the sixth embodiment performs such minutia information comparison for each cell or each sub-cell to make a match or a non-match decision.

Next, referring to the flowchart of FIG. 13, a description will be made hereinbelow of a verification operation of the fingerprint verifying apparatus 10 according to the sixth embodiment. The following verification operation is an application of foregoing sub-cells to the verification operation of the third embodiment of FIG. 8. Here, processing steps in FIG. 13 similar to the corresponding steps in FIG. 8 are given the same step numbers as those of FIG. 8, and their detailed descriptions will be omitted here.

As shown in FIG. 13, because of the sub-cells employed in the verification operation, steps S61', S64', and S65' are carried out in the sixth embodiment, instead of steps S61, S64, and S65 of FIG. 8.

More precisely, if it is judged that the direction θ comparison result satisfies the predetermined alignment condition (YES route) at step S57, the cell basic information obtaining unit 12 extracts/obtains cell basic information (fingerprint ridge pitch λ and offset amount δ), as to-be-verified data, from the fingerprint image contained in the individual cells that are obtained by the cell dividing unit 11 (step S60), and the cell feature information obtaining unit 13 divides each of the individual cells into four sub-cells, and extracts/obtains minutia information, as to-be-verified data, from the fingerprint image contained in the individual sub-cells (step S61').

After that, the verifying unit 14 compares ridge pitches λ and offset amounts δ of corresponding cells between the registered data and the to-be-verified data (step S62). If the comparison result satisfies a predetermined match condition (YES route of step S63), the verifying unit 14 compares corresponding cells between the registered data and the reobtained to-be-verified data in terms of minutia information contained in each cell or each sub-cell (step S64'), and evaluates whether or not the comparison result satisfies a predetermined match condition (whether or not the match degree is equal to or greater than a predetermined value)(step S65').

In this manner, according to the sixth embodiment, not only like effects and benefits to those of the third embodiment but also the following advantages are realized. Since the minutia information comparison is performed using minutia information obtained from sub-cells, which are smaller divisions than cells, it is possible to compare the registered data and the to-be-verified data more strictly. This will improve the reliability of the verification result and also reduce the false verification rate.

In the sixth embodiment, the aforementioned sub-cells are applied to the verification operation of the third embodiment of FIG. 8, and such sub-cells are also applicable to the first through the fifth embodiment and to the subsequent seventh embodiment. In any of the cases, like effects and benefits to those of the above description will be realized. At that time, a minutia information extracting process similar to the process of step S61' of the sixth embodiment is performed at step S14 (FIG. 4), step S38 (FIG. 6), step S61 (FIG. 9), step S73 (FIG. 10), step S102 (FIG. 12), and step S123 (FIG. 17 and FIG. 19) of the seventh embodiment (described later). Further, a minutia information comparison process of step S64' of the sixth embodiment is performed at step S20 (FIG. 4), step S41 (FIG. 6), step S64 (FIG. 9), step S74 (FIG. 10), step S103 (FIG. 12), and step S124 (FIG. 17 and FIG. 19) of the seventh embodiment. Still further, a comparison result evaluation process of step S65' of the sixth embodiment is performed at step S21 (FIG. 4), step S42 (FIG. 6), step S65 (FIG. 9), step S75 (FIG. 10), step S104 (FIG. 12), and step S125 (FIG. 17 and FIG. 19) of the seventh embodiment. Furthermore, although the individual cells are divided into four sub-cells in the sixth embodiment, the present invention should by no means be limited to this, and the cells can also be divided into 2, 3, or even 5 or more sub-cells depending on the size of the cells.

[7] Seventh Embodiment

Figure 16:
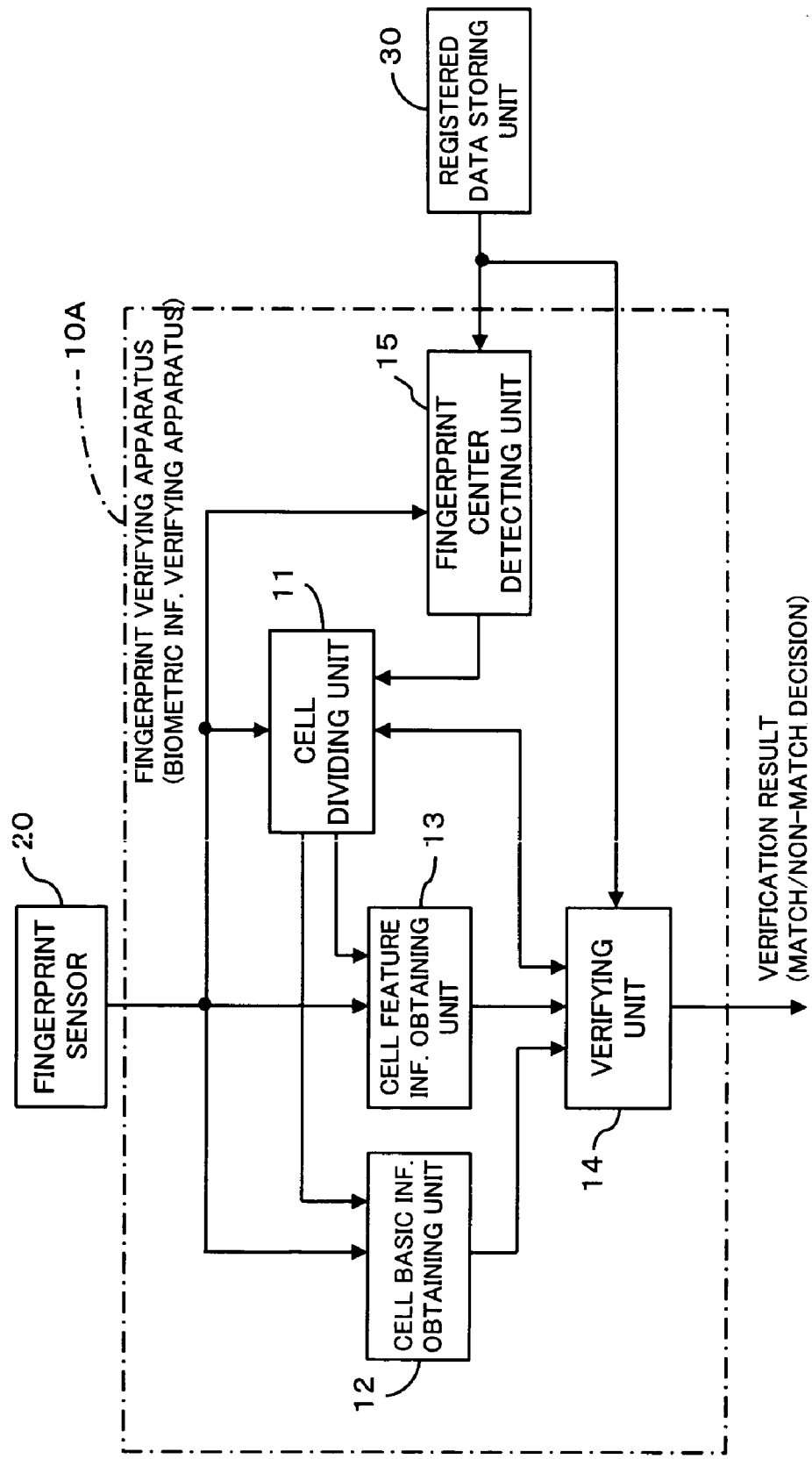
FIG. 16 is a block diagram showing a functional construction of a biometric information verifying apparatus (fingerprint verifying apparatus) according to a seventh embodiment of the present invention.

Referring to FIG. 16, a description will be made hereinbelow of an operation of a biometric information verifying apparatus (fingerprint verifying apparatus) 10 of a seventh embodiment of the present invention. FIG. 16 shows a functional construction of the apparatus.

As shown in FIG. 16, as in the case of the fingerprint verifying apparatus 10 of FIG. 1, the fingerprint verifying apparatus 10A of the seventh embodiment verifies a to-be-verified fingerprint image (a to-be-verified biometric information image; a ridge image of a biometric pattern), which is input by a user at the time of user verification, against a registered fingerprint image (a registered biometric information image; a ridge image of a biometric pattern). The fingerprint verifying apparatus 10A has a construction similar to the fingerprint verifying apparatus 10 with a fingerprint center detecting unit (pattern center detecting unit) 15 added thereto.

The fingerprint center detecting unit 15, which detects a fingerprint center in a fingerprint image, has a function of detecting a fingerprint center (coordinate) of a registered fingerprint image (registered data) by use of directions θ obtained from individual cells of registered data provided by the data storing unit 30, and also a function of detecting a fingerprint center (coordinate) in a to-be-verified fingerprint image input by a user through the fingerprint sensor 20.

Figure 18:
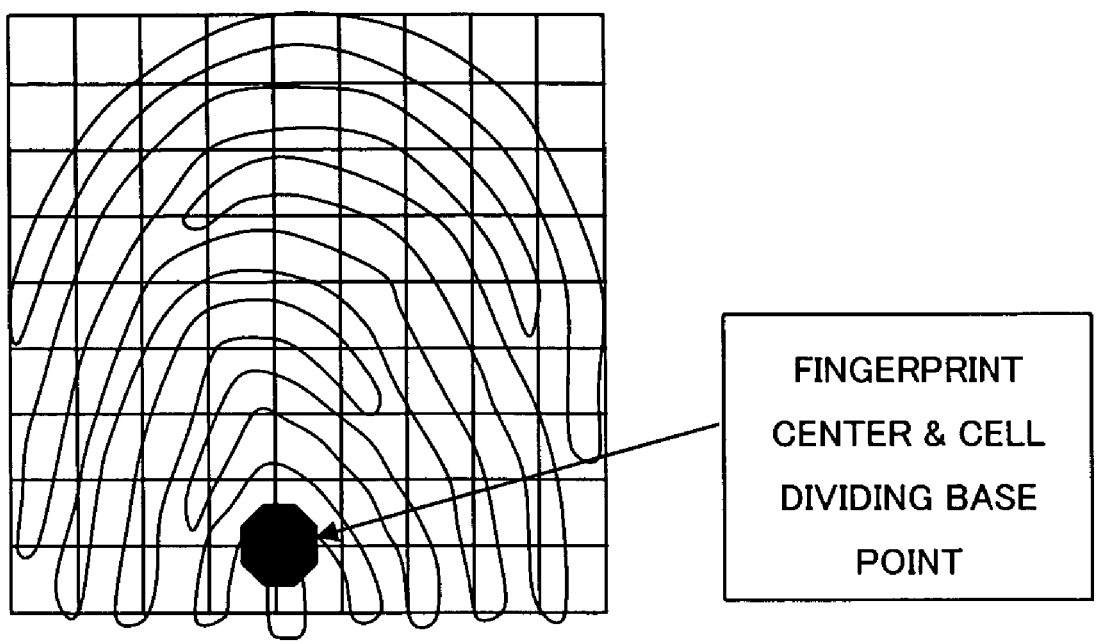
FIG. 18 is a view for use in describing division of a fingerprint image into cells, using the fingerprint center as a reference point for division.

The cell dividing unit 11 of the fingerprint verifying apparatus 10A of the seventh embodiment divides the to-be-verified fingerprint image into predetermined cells based on a cell division reference point that is obtained on the basis of the fingerprint center detected by the fingerprint center detecting unit 15 (see FIG. 18). At this time, the fingerprint center detected by the fingerprint center detecting unit 15 can be used as it is as a cell division reference point, or alternatively, an appropriate offset amount can be added to the detected fingerprint center so that the resultant position can be used as the cell division reference point.

Figure 17:
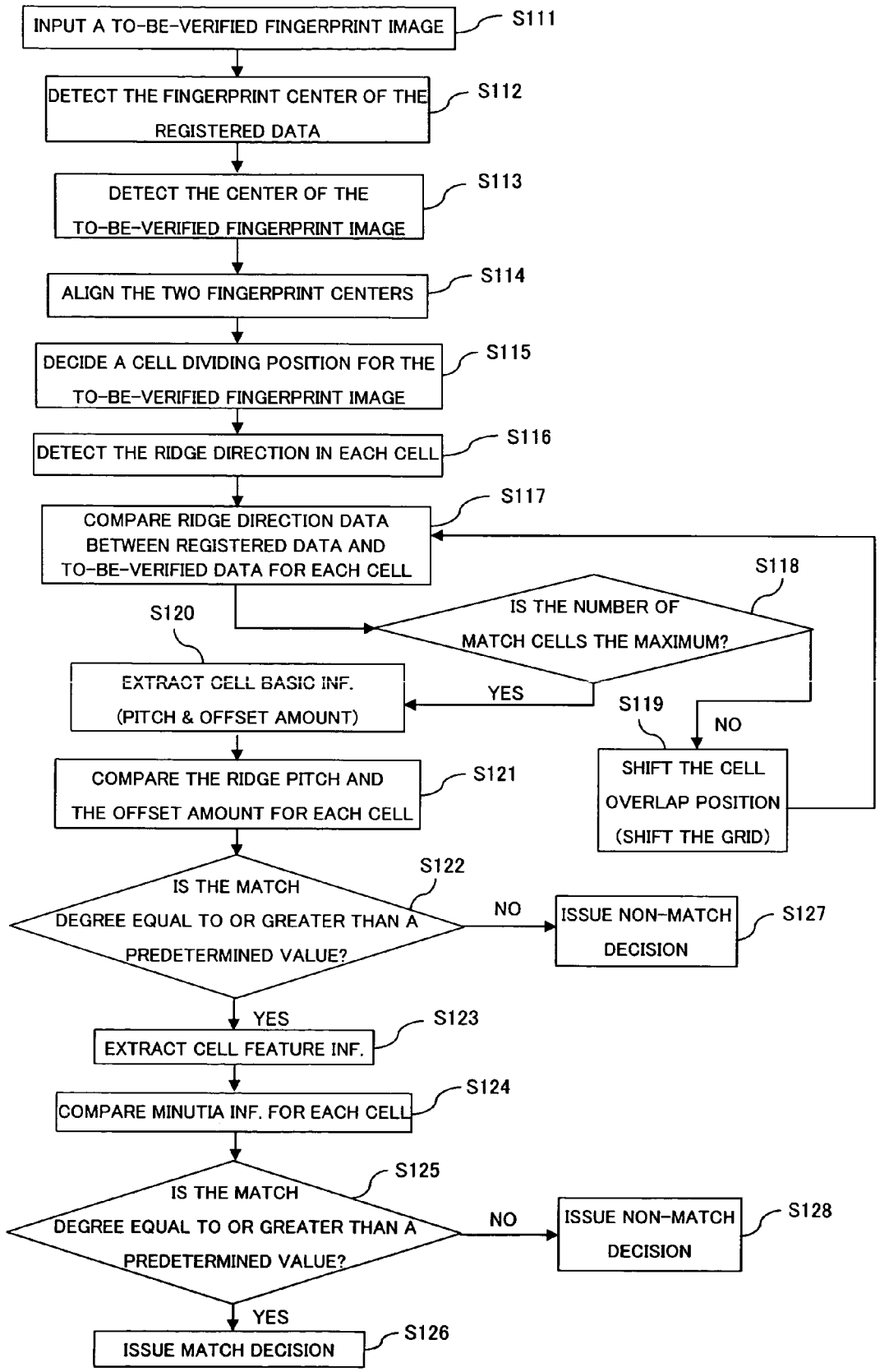
FIG. 17 is a flowchart indicating an operation of the biometric information verifying apparatus (fingerprint verifying apparatus) according to the seventh embodiment of the present invention.

Referring to FIG. 17 and FIG. 18, a description will now be made of an operation of the biometric information verifying apparatus (fingerprint verifying apparatus) 10A of the seventh embodiment. FIG. 17 shows a flowchart indicating the operation; FIG. 18 is a view for describing cell division which uses a fingerprint center as a division reference point. In the seventh embodiment, a fingerprint center (coordinate) is employed in verification processing as well as the foregoing cell basic information and cell feature information (minutia information) of each cell.

As shown in FIG. 17, when a user inputs a fingerprint image (to-be-verified fingerprint image) through a fingerprint sensor 20 at user verification (step S111), the fingerprint center detecting unit 15 detects a fingerprint center in registered data provided by the data storing unit 30, using directions θ of individual cells of the registered data (S112), and also detects a fingerprint center of the input to-be-verified fingerprint image (step S113) as shown in FIG. 18.

The cell dividing unit 11 aligns the two fingerprint centers detected at step S112 and step S113, thereby laying the registered data and the to-be-verified fingerprint image to overlap each other (step S114). After that, as shown in FIG. 18, a cell division reference point is determined based on the aligned fingerprint centers (a cell division point of the to-be-verified fingerprint image; a position of the grid), and the cell dividing unit 11 divides the to-be-verified fingerprint image into cells, which are the same units as those that are used in cell division of the registered fingerprint image (step S115). The cell basic information obtaining unit 12 then extracts and obtains ridge directions θ alone, from the fingerprint image contained in the individual cells that are obtained by the cell dividing unit 11 (step S116).

After that, the verifying unit 14 compares ridge directions θ of the individual cells of the registered data provided by the registration data storing unit 30 with ridge directions θ of the individual cells extracted and obtained at step S116, thereby aligning the registered data and the to-be-verified data (step S117 through step S119) in a similar manner to the first embodiment. Since steps S117 through S119 correspond to steps S15 through S17 of FIG. 4, respectively, descriptions of these steps S117 through S119 are omitted here.

If the registered data cells and the to-be-verified data cells are aligned, such that the number of match cell pairs is a maximum (YES route of step S118), the cell basic information obtaining unit 12 extracts and obtains cell basic information (ridge pitch λ and offset amount δ) from the fingerprint image contained in the individual cells, which are obtained by the cell dividing unit 11, as to-be-verified data (step S120). The verifying unit 14 then compares ridge pitches λ and offset amounts δ of corresponding cells between the registered data and the to-be-verified data (step S121), and then evaluates whether or not the comparison result satisfies a predetermined match condition (whether or not the match degree is equal to or greater than a predetermined value) (step S122).

If the match degree of the pitch λ and that of the offset amount δ are equal to or greater than a predetermined value (YES route of step S122), the cell feature information obtaining unit 13 extracts and obtains minutia information (cell feature information) of the individual cells, which are obtained by the cell dividing unit 11, as to-be-verified data (step S123). After that, the verifying unit 14 compares minutia information of corresponding cells between the registered data and the to-be-verified data (step S124), and evaluates whether or not the comparison result satisfies a predetermined match condition (whether or not the match degree is equal to or greater than a predetermined value) (step S125). At this time, if the minutia information includes the number of minutia points for each minutia type, the minutia types and the number of minutia points for each minutia type are compared in the corresponding cells between the registered data and the to-be-verified data.

If the match degree of the minutia information is equal to or greater than a predetermined value (YES route of step S125), a match decision is made (step S126). That is, it is judged that the registered fingerprint image (registered data) and the to-be-verified fingerprint image (to-be-verified data) belong to the same user (fingertip).

On the other hand, if the match degree is judged to be smaller than the predetermined value at step S122 and step S125 (NO route), a non-match decision is made (step S127 and step S128). That is, it is judged that the registered fingerprint image (registered data) and the to-be-verified fingerprint image (to-be-verified data) do not belong to the same user (fingertip).

In this manner, according to the seventh embodiment, not only like effects and benefits to those of the first embodiment but also the following advantages are realized. The reference point, based on which the to-be-verified fingerprint image is divided into cells, is determined based on the fingerprint center of the to-be-verified fingerprint image obtained by the fingerprint center detecting unit 15. This makes it possible to perform more reliable alignment of the registered data and the to-be-verified data in a shorter time, assuming that the registered data is also divided into cells based on the fingerprint center of the registered fingerprint image.

Figure 19:
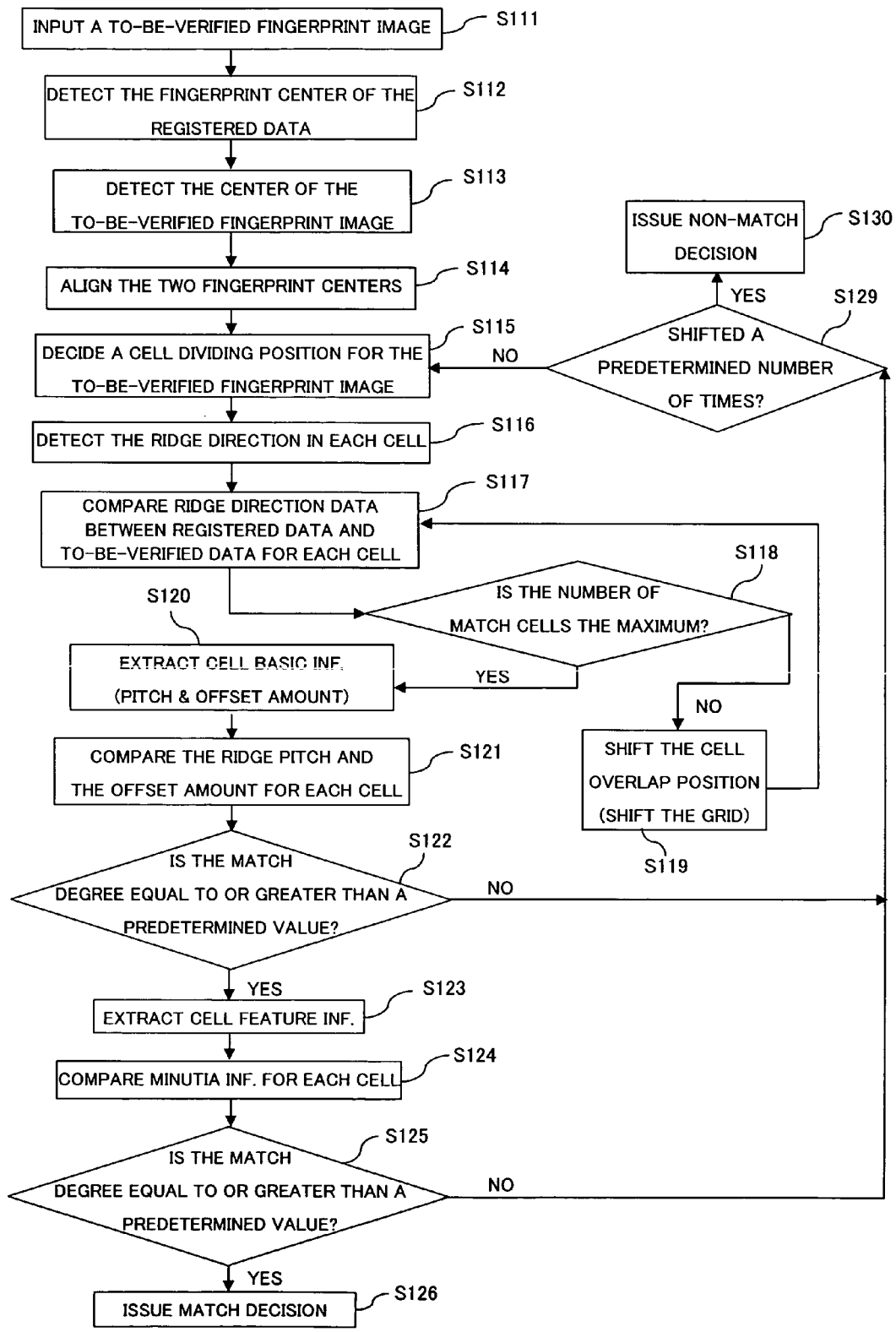
FIG. 19 is a flowchart indicating an operation of the biometric information verifying apparatus (fingerprint verifying apparatus) according to a modified example of the seventh embodiment.

FIG. 19 shows a flowchart indicating a modified example of the operation of the biometric information verifying apparatus (fingerprint verifying apparatus) according to the seventh embodiment. In the modified example of the seventh embodiment of FIG. 19, the verifying procedures are basically the same as those of the seventh embodiment of FIG. 17, but the difference lies in that, if the match degree is judged to be smaller than a predetermined value at step S122 and step S125, the verifying unit 14 evaluates whether or not the number of times the cell division reference point was shifted is equal to or greater than a predetermined value (step S129). If the evaluation result is negative (NO route of step S129), the procedure returns to step S115, and the cell division reference point (fingerprint center) of the to-be-verified fingerprint image is shifted by a predetermined amount, and the cell dividing unit 11 divides the to-be-verified fingerprint image, which is input through the fingerprint sensor 20, into cells once again based on the shifted cell division reference point, as already described with reference to FIG. 7A, FIG. 7B, and FIG. 20. The cell basic information obtaining unit 12 then extracts and obtains ridge directions θ alone, from the fingerprint image contained in the individual cells that are obtained as a result of redivision by the cell dividing unit 11 (step S116).

After that, in a similar manner to the above, cell alignment between the registered data and the to-be-verified data is performed once again, such that the number of direction θ match cell pairs is a maximum (step S117 through step S119), and the cell basic information obtaining unit 12 and the cell feature information obtaining unit 13 then reobtain cell basic information and cell feature information, respectively, from the fingerprint image contained in the individual cells, which are obtained as a result of the redivision by the cell dividing unit 11, as to-be-verified data (step S120 and step S123), and the verifying unit 14 compares/evaluates the registered data and the reobtained to-be-verified data once again (steps S121, S122, S124, and S125).

As a result of the reevaluation, if the match degree of the minutia information is equal to or greater than a predetermined value (YES route of step S125), a match decision is made (step S126). On the other hand, if the match degree is judged to be smaller than the predetermined value at step S122 and at step S125 (NO route), the procedure returns to step S129, and the above reprocessing is then repeated. If the cell division reference point is shifted a predetermined number of times or more (YES route of step S129), that is, if the comparison result does not satisfy the predetermined match condition even after a predetermined number of times of repetitions of the reprocessing, a non-match decision is made (step S130). In other words, it is judged that the registered fingerprint image (registered data) and the to-be-verified fingerprint image (to-be-verified data) do not belong to the same user (fingertip).

With this arrangement, as in the case of the second embodiment, if neither the cell basic information (ridge pitch λ and offset amount δ) comparison result nor the minutia information comparison result for the individual cells satisfies the predetermined conditions, the cell division reference point (fingerprint center) of the to-be-verified fingerprint image is shifted by a predetermined amount, and the cell division, cell alignment, information acquisition, information comparison/valuation are performed once again. This will improve the accuracy of pattern matching verification between the registered data and the to-be-verified data, thereby further improving the reliability of the verification result and further reducing the false verification rate.

Here, in the seventh embodiment and its modification, the fingerprint center detecting unit 15 detects the fingerprint center of the registered data (registered fingerprint image) at the time of user verification, by using the direction data of the registered data. However, such detection can alternatively be performed at the time of user registration. In that case, a fingerprint center (coordinate) is detected from a to-be-registered fingerprint image which is input by a user at enrollment, and the thus-detected fingerprint center (coordinate) is stored in advance as registered data in the data storing unit 30, together with the cell basic information and the cell feature information.

The thus previously stored fingerprint center of the registered fingerprint image makes it possible to skip the fingerprint center detection process (step S112) at verification, thereby increasing the speed of the verification processing.

In addition, a fingerprint center-employed verification is also applicable to the above-described verification operations of the first through the sixth embodiment, and like effects and benefits to those of the above will be realized in the applications.

[8] Other Modifications

The present invention should by no means be limited to the above-illustrated embodiment, and various changes or modifications may be suggested without departing from the gist of the invention.

[8-1] For instance, when the verifying unit 14 aligns the registered data and the to-be-verified data in the fingerprint verifying apparatus 10 and 10A, the to-be-verified data can be turned in relation to the registered data, while the verifying unit 14 compares the direction information (θ) or the minutia information of the individual cells of the registered data with the direction information (θ) or the minutia information of the individual cells of the to-be-verified data. The turning of the to-be-verified data (to-be-verified biometric information image) will be continued until the to-be-verified data is eventually put into a position where the comparison result satisfies a predetermined condition.

At this time, after extraction of the ridge direction θ from each cell, the number of match cell pairs, which are pairs of cells, one from the registered data and the other from the to-be-verified data, having identical directions θ, is checked every time the to-be-verified data is turned by a predetermined amount in relation to the registered data. The turning of the to-be-verified data is continued until the number reaches or exceeds a predetermined threshold. Here, if the modification includes a fingerprint center detecting unit 15, as in the case of the fingerprint verifying apparatus 10A, the fingerprint center of the registered fingerprint image (registered data) or the to-be-verified fingerprint image (to-be-verified data) is utilized as a center of the turning of the data.

This arrangement will adjust and absorb rotation errors (displacement of rotational direction) between the registered data (registered fingerprint image) and the to-be-verified data (to-be-verified fingerprint image), thereby increasing the accuracy of alignment of the registered data and the to-be-verified data.

Further, when confirming the coincidence of the direction data ($\theta$), the directions ($\theta$) of the individual cells of the to-be-verified data are turned by a predetermined angle before the confirmation performed, to obtain an angle at which the number of match cell pairs is a maximum. The fingerprint image or a cell division grid is then turned by the obtained angle before cell division is performed, thereby also coping with the rotation errors.

Figure 25:
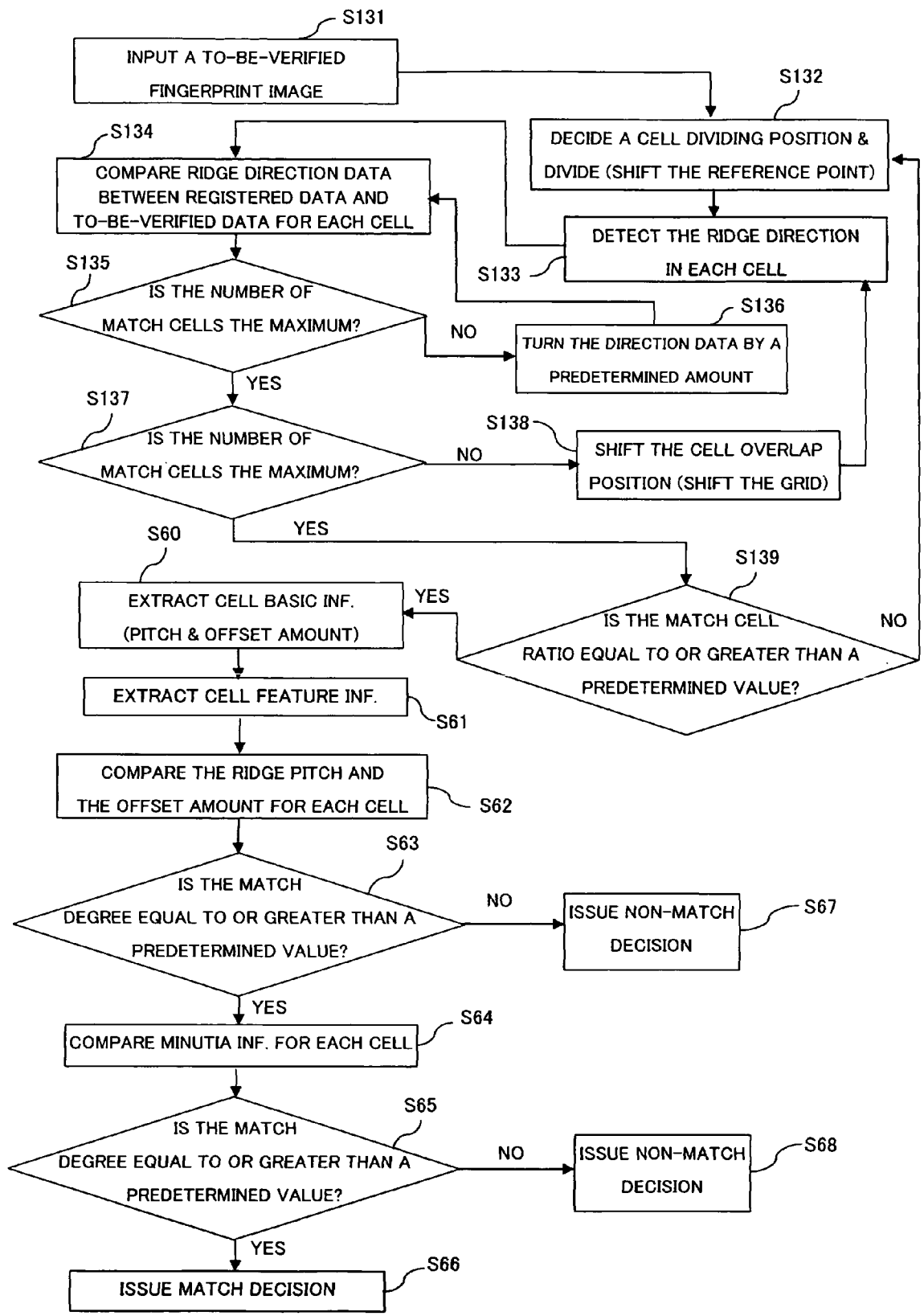
FIG. 25 is a flowchart indicating verification procedures performed on the biometric information verification apparatus (fingerprint verifying apparatus), in which procedures the direction data is turned during the verification.

Referring to FIG. 25, a description will now be made hereinbelow of procedures of verifying a fingerprint while turning the to-be-verified data. Note that the following description will be made of the latter method, that is, the method of turning direction data ($\theta$) of the individual cells of the to-be-verified data.

As shown in FIG. 25, when a user inputs a fingerprint image (to-be-verified fingerprint image) through a fingerprint sensor 20 at user verification (step S131), the cell dividing unit 11 decides a cell dividing position and divides the input to-be-verified fingerprint image, which is input through the fingerprint sensor 20, into cells which are the same as the cells used at cell division performed at user enrollment (step S132). The cell basic information obtaining unit 12 then extracts and obtains ridge directions $\theta$ alone, from the fingerprint image contained in the individual cells that are obtained as a result of redivision by the cell dividing unit 11 (step S133).

After that, in the example of FIG. 25, the following procedures of step S133 through step S139 are performed to align the registered fingerprint image (or registered data cells) and the to-be-verified fingerprint image (or to-be-verified data cells), while adjusting the direction data ($\theta$) of the individual cells by turning the cells, such that the number of match cell pairs is a maximum.

After detection of direction data at step S133, the verifying unit 14 compares ridge directions $\theta$ of the individual cells of the registered data provided by the registration data storing unit 30 with ridge directions $\theta$ of the individual cells extracted/obtained at step S133, thereby adjusting turning of the direction data ($\theta$) (step S134 through step S136). More specifically, the registered data cells and the to-be-verified data cells are superposed to compare their directions $\theta$ (step S133), and the verifying unit 14 evaluates whether or not the number of match cell pair is a maximum (step S134). If the evaluation result is negative (NO route of step S134), the direction data (that is, $\theta$) is turned by a predetermined amount (step S136), and the process returns to step S134, and direction ($\theta$) comparison is performed once again. These procedures are repeated until the number of match cell pairs is judged to be a maximum (until a "YES" decision is made). Here, the evaluation at step S135 can be made on "whether or not the match cell ratio is equal to or greater than a predetermined value," instead of "whether or not the number of match cell pairs is a maximum," to adjust turning of the direction data ($\theta$) such that the match cell ratio is equal to or greater than a predetermined value.

After completion of the turning adjustment of the direction data of the individual cells, such that the number of match cell pairs is a maximum (YES route of step S135), the registered data and the to-be-verified data are aligned such that the number of match cell pairs is a maximum (step S133 through step S138). If it is judged that the number of match cell pairs in the current alignment state is not a maximum (NO route of step S137), the aligned cells are shifted (the grid is shifted; step S138), and the process goes back to step S133. Ridge directions $\theta$ in the individual cells are then detected once again, and similar procedures to those of the above are repeated until step S137 judges that the number of match cell pairs is a maximum (until a "YES" decision is made). At this time, the evaluation at step S137 can also be made on "whether or not the match cell ratio is equal to or greater than a predetermined value," instead of "whether or not the number of match cell pairs is a maximum," to perform the above alignment such that the match cell ratio is equal to or greater than a predetermined value.

If the registered data cells and the to-be-verified data cells are aligned such that the number of match cell pairs is a maximum (YES route of step S137), the verifying unit 14 evaluates whether or not the number of match cell pairs is equal to or greater than a predetermined value (step S139). If the evaluation result is negative (NO route of step S139), the process goes back to step S132. In a similar manner to the foregoing description with reference to FIG. 7A, FIG. 7B, and FIG. 20, the cell division reference point in the to-be-verified fingerprint image is shifted by a predetermined amount, and the cell dividing unit 11 then redivides the to-be-verified fingerprint image, which is input through the fingerprint sensor 20, into cells based on the thus-shifted cell division reference point. The cell basic information obtaining unit 12 re-extracts/reobtains ridge directions $\theta$ alone, from the fingerprint image contained in individual cells that are obtained by the redivision by the cell dividing unit 11 (step S53). After that, similar procedures to those of the above (step S132 through step S139) are repeated until step S139 judges that the match cell ratio is equal to or greater than a predetermined value. If the match cell ratio is judged to be equal to or greater than a predetermined value (YES route) at step S139, similar procedures (step S60 through step S68) to those already described referring to FIG. 8 are performed.

[8-2] In the foregoing fingerprint verifying apparatus 10 and 10A, when the verifying unit 14 evaluates whether or not the minutia information comparison result satisfies a predetermined condition, unclear cells, of the individual cells which the to-be-verified biometric information image has been divided into, can be assigned a light weight in relation to the minutia (cell feature) information comparison result. This will minimize effects of unreliable comparison results on verification, thereby making match/non-match decisions more reliable by use of clearer cells in minutia information comparison (that is, more reliable comparison results).

Here, such unclear parts (cells) can be detected and recognized as: (1) parts whose direction components extracted by the Fourier transform are smaller than a predetermined threshold; (2) cells each including multi-directional rectangular areas made up of pixels with pixel values such that variations among integrated pixel values of those rectangular areas are smaller than a predetermined threshold (that is, cells in which the difference in peak between black and white pixel distributions is smaller than a predetermined value; in other words, cells in which ridge images are unclear); (3) parts which reveal directions smaller than a predetermined value even after direction detection by mask processing.

[8-3] The descriptions of the above embodiments are made of examples where biometric information is a fingerprint and where a biometric information image is a ridge image of the fingerprint (a ridge image of a biometric pattern). However, the present invention should by no means be limited to this, and is also applicable in cases where the biometric information is a palm print, a blood vessel (retina and vein) pattern, iris (iris muscle) pattern, facial pattern, or the like, whereby like effects and benefits to those of the above embodiments will also be realized.

[8-4] Minutia information is extracted from each cell with the following timing. (1) Minutia information is extracted from the whole fingerprint image before the image is divided into cells (grid division), and minutia information of the individual cells is then obtained from the minutia information thus already extracted. (2) Minutia information is extracted from individual cells after division of the fingerprint image into cells. Minutia information can be extracted with either of timing (1) and timing (2), and the foregoing descriptions were made of examples that employ timing (2).

[8-5] Functions (all or apart) of the cell dividing unit 11, cell basic information obtaining unit 12, cell feature information obtaining unit 13, verifying unit 14, and fingerprint center detecting unit 15 are realized by a computer (CPU, information processor, or various types of terminals) which executes predetermined application programs, which are recorded in computer-readable recording media such as flexible discs, CD-ROMs, CD-Rs, CD-RWs, and DVDs. The computer reads the programs from such recording media to transfer the programs to an internal or external storage device, to store the programs therein. Alternatively, the programs can be recorded in storage devices (recording media) such as magnetic discs, optical discs, and magneto-optical discs, to be transferred to the computer over a communication network.

Here, the "computer" is defined as a concept including hardware and an OS (Operating System), or hardware operating under control of an OS. Further, in cases where hardware is capable of operating by itself without the necessity of an OS, the hardware is equivalent to the "computer." The hardware includes at least a micro processor such as a CPU and a means for reading computer programs from recording media. The aforementioned predetermined application programs contain program codes that instructs the computer to function as the cell dividing unit 11, cell basic information obtaining unit 12, cell feature information obtaining unit 13, verifying unit 14, and fingerprint center detecting unit 15. Further, apart of those functions can be realized by the OS, not by such application programs.

Moreover, as recording media used in the embodiments of the present invention, not only the above-mentioned flexible discs, CR-ROMs, CD-Rs, CD-RWs, DVDs, magnetic discs, optical discs, and magneto-optical discs, but also various types of other computer-readable media, such as IC cards, ROM cartridges, magnetic tapes, punch cards, internal storage devices (memories such as RAMs and ROMs), external storage devices, and printed matter with any codes such as barcodes printed thereon, are also applicable.

What is claimed is:

1. A biometric information verifying apparatus which compares a registered biometric information image and a to-be-verified biometric information image input by a user at user verification, said apparatus comprising:
    a cell dividing unit which obtains a number of cells by dividing an entire part of the to-be-verified biometric information image into a grid or matrix of a same shape as cells obtained through dividing an entire part of the registered biometric information image;
    a cell basic information obtaining unit which obtains cell basic information from the individual cells that are obtained by said cell dividing unit, said cell basic information including direction information of the to-be-verified biometric information image contained in the individual cells;
    a cell feature information obtaining unit which obtains minutia information of the to-be-verified biometric information image, as cell feature information, from the individual cells that are obtained by said cell dividing unit; and
    a verifying unit which verifies the to-be-verified biometric information image against the registered biometric information image by comparison between registered data and to-be-verified data,
    said registered data including: (i) cell basic information obtained from individual cells making up the registered biometric information image, which cell basic information includes direction information of the registered biometric information image contained in the individual cells; and (ii) cell feature information obtained from the individual cells making up the registered biometric information image, which cell feature information includes minutia information of the registered biometric information image contained in the individual cells, and
    said to-be-verified data including the cell basic information and the cell feature information, which are obtained by said cell basic information obtaining unit and said cell feature information obtaining unit, respectively,
    said verifying unit,
    obtaining a first comparison result by comparing the direction information of the individual cells of the entire part of the to-be-verified biometric information image and the direction information of the individual cells of the entire part of the registered biometric information image, and aligning the entire part of the to-be-verified biometric information image and the entire part of the registered biometric information image with each other based on the first comparison result,
    obtaining a second comparison result by comparing at least the minutia information of corresponding cells between the to-be-verified data and the registered data to evaluate whether or not the second comparison result satisfies a predetermined match condition, and
    if the second comparison result satisfies the predetermined match condition, making a match decision, in which the to-be-verified biometric information image and the registered biometric information image are judged to belong to one and the same user.

2. A biometric information verifying apparatus as set forth in claim 1, wherein, if the comparison result does not satisfy the predetermined match condition,
    said cell dividing unit shifts a cell division reference point by a predetermined amount, and redivides the to-be-verified biometric information image into cells, and
    said cell basic information obtaining unit and said cell feature information obtaining unit reobtain to-be-verified data from the individual cells that are obtained by the redivision by said cell dividing unit,
    said verifying unit,
    obtaining a third comparison result by comparing the reobtained direction information of the individual cells of the to-be-verified biometric information image and the direction information of the individual cells of the registered biometric information image, and realigning the to-be-verified biometric information image and the registered biometric information image with each other based on the third comparison result,
    obtaining a fourth comparison result by comparing at least the minutia information of corresponding cells between the registered data and the to-be-verified data to reevaluate whether or not the comparison result satisfies the predetermined match condition, and if the fourth comparison result satisfies the predetermined match condition, making a match decision, in which the to-be-verified biometric information image and the registered biometric information image are judged to belong to one and the same user.

3. A biometric information verifying apparatus as set forth in claim 2, wherein, if the fourth comparison result does not satisfy the predetermined match condition even after a predetermined number of times of repetitions of the redividing process by said cell dividing unit, the reobtaining process by said cell basic information obtaining unit, the reobtaining process by said cell feature information obtaining unit, and the reevaluating process by said verifying unit, said verifying unit makes a non-match decision, in which the to-be-verified biometric information image and the registered biometric information image are judged not to belong to one and the same user.

4. A biometric information verifying apparatus as set forth in claim 1, wherein said verifying unit aligns the registered biometric information image and the to-be-verified biometric information image, such that a number of match cell pairs, which are pairs of cells, one from the registered data and the other from the to-be-verified data, having coincident direction information based on the first comparison result, is a maximum, or such that a match cell ratio, which is a ratio of the number of the match cell pairs to a total number of the cells obtained by the cell dividing unit, is equal to or greater than a predetermined value.

5. A biometric information verifying apparatus as set forth in claim 1, wherein said verifying unit obtains the second comparison result by comparing the minutia information of corresponding cells between the registered data and the to-be-verified data, and also obtains a fifth comparison result by comparing other kinds of cell basic information than the direction information of the corresponding cells, and evaluates whether or not the second in the fifth comparison results satisfy the predetermined match condition.

6. A biometric information verifying apparatus as set forth in claim 5, wherein the cell basic information includes pitch information and offset information, as well as the direction information, of the to-be-verified biometric information image in individual cells obtained by the cell dividing unit.

7. A biometric information verifying apparatus as set forth in claim 6,
wherein the biometric information image is a ridge image obtained from a biometric pattern,
wherein the direction information is a ridge direction in the individual cell,
wherein the pitch information is a ridge pitch in the individual cell, and
wherein the offset information is an offset amount from a reference point in the individual cell.

8. A biometric information verifying apparatus as set forth in claim 1, wherein the biometric information image is a ridge image obtained from a biometric pattern,
said apparatus further comprising a pattern center detecting unit which detects a center of the biometric pattern contained in the to-be-verified biometric information image, and
said cell dividing unit divides the to-be-verified biometric information image into cells, based on a cell division reference point which is calculated based on the pattern center detected by said pattern center detecting unit.

9. A biometric information verifying apparatus as set forth in claim 8, wherein the cell division reference point is a position shifted from the pattern center of the biometric pattern by a predetermined amount.

10. A biometric information verifying apparatus as set forth in claim 1,
wherein the minutia information included in the registered data is obtained from individual sub-cells, which are obtained by dividing each individual cell into two or more sub-cells,
wherein said cell feature information obtaining unit, when obtaining the minutia information from the individual cells of the to-be-verified biometric information image, divides each of the individual cells into two or more sub-cells, and obtains the minutia information from the individual sub-cells, and
wherein said verifying unit, when comparing the minutia information of corresponding cells between the registered data and the to-be-verified data, performs the minutia information comparison for each said sub-cell.

11. A biometric information verifying apparatus as set forth in claim 1, wherein, at the alignment of the registered biometric information image and the to-be-verified biometric information image, said verifying unit obtains an eighth comparison result by comparing direction information or minutia information of the individual cells between the registered data and the to-be-verified data, while turning the to-be-verified biometric information image relatively to the registered biometric information image, and turns the to-be-verified biometric information image into a position where the eighth comparison result satisfies a predetermined condition.

12. A biometric information verifying apparatus as set forth in claim 11,
wherein the biometric information image is a ridge image obtained from a biometric pattern, and
wherein the to-be-verified biometric information image is turned about a pattern center of the biometric pattern contained in the registered biometric information image or the to-be-verified biometric information image.

13. A biometric information verifying apparatus as set forth in claim 1, wherein an unclear cell, of the individual cells obtained by dividing the to-be-verified biometric information image, is assigned a light weight in relation to the second comparison result for the unclear cell.

14. A biometric information verifying apparatus as set forth in claim 1, wherein the minutia information includes: a minutia type contained in the individual cells; and the number of minutiae for each minutia type contained in the individual cells.

15. A biometric information verifying apparatus as set forth in claim 1, wherein the minutia information is information about presence or absence of a minutia in the individual cells.

16. A biometric information verifying apparatus which compares a registered biometric information image and a to-be-verified biometric information image input by a user at user verification, said apparatus comprising:
a cell dividing unit which obtains a number of cells by dividing an entire part of the to-be-verified biometric information image into a grid or matrix of a same shape as cells obtained through dividing an entire part of the registered biometric information image;
a cell basic information obtaining unit which obtains cell basic information from the individual cells that are obtained by said cell dividing unit, said cell basic information including direction information of the to-be-verified biometric information image contained in the individual cells;

a cell feature information obtaining unit which obtains minutia information of the to-be-verified biometric information image, as cell feature information, from the individual cells that are obtained by said cell dividing unit; and a verifying unit which verifies the to-be-verified biometric information image against the registered biometric information image by comparison between registered data and to-be-verified data, said registered data including: (i) cell basic information obtained from individual cells making up the registered biometric information image, which cell basic information includes direction information of the registered biometric information image contained in the individual cells; and (ii) cell feature information obtained from the individual cells making up the registered biometric information image, which cell feature information includes minutia information of the registered biometric information image contained in the individual cells, and said to-be-verified data including the cell basic information and the cell feature information, which are obtained by said cell basic information obtaining unit and said cell feature information obtaining unit, respectively, said verifying unit, obtaining a first comparison result by comparing the direction information of the individual cells of the entire part of the to-be-verified biometric information image and the direction information of the individual cells of the entire part of the registered biometric information image, and aligning the entire part of the to-be-verified biometric information image and the entire part of the registered biometric information image with each other based on the first comparison result, and evaluating whether or not the first comparison result satisfies a predetermined alignment condition, if the first comparison result satisfies the predetermined alignment condition, obtaining a second comparison result by comparing at least the minutia information of corresponding cells between the to-be-verified data and the registered data to evaluate whether or not the second comparison result satisfies a predetermined match condition, and if the second comparison result satisfies the predetermined match condition, making a match decision, in which the to-be-verified biometric information image and the registered biometric information image are judged to belong to one and the same user.

17. A biometric information verifying apparatus as set forth in claim 16, wherein said cell basic information obtaining unit firstly obtains, as the to-be-verified data, direction information, which is required at aligning the to-be-verified biometric information image and the registered biometric information image with each other, from individual cells that are obtained by the cell dividing unit and making up the to-be-verified biometric information image, wherein, if said verifying unit judges that the first comparison result satisfies the predetermined alignment condition, said cell basic information obtaining unit obtains other kinds of cell basic information than the direction information, as the to-be-verified data, from the individual cells and also, said cell feature information obtaining unit obtains the minutia information from the individual cells as the to-be-verified data.

18. A biometric information verifying apparatus as set forth in claim 17, wherein, if said verifying unit judges that the first comparison result does not satisfy the predetermined alignment condition, said cell dividing unit shifts a cell division reference point by a predetermined amount, and redivides the to-be-verified biometric information image into cells, and said cell basic information obtaining unit reobtains the direction information from the individual cells which are obtained by the redivision by said cell dividing unit, said verifying unit obtains a third comparison result by comparing the reobtained direction information of the individual cells of the to-be-verified biometric information image and the direction information of the individual cells of the registered biometric information image, and realigns the to-be-verified biometric information image and the registered biometric information image with each other based on the third comparison result, and reevaluates whether or not the third comparison result satisfies the predetermined alignment condition.

19. A biometric information verifying apparatus as set forth in claim 18, wherein said cell dividing unit, said cell basic information obtaining unit, and said verifying unit repeat the redividing process, the reobtaining process, and the reevaluating process, respectively, until the third comparison result satisfies the predetermined alignment condition.

20. A biometric information verifying apparatus as set forth in claim 18, wherein, if the third comparison result does not satisfy the predetermined alignment condition even after a predetermined number of times of repetitions of the redividing process by said cell dividing unit, the reobtaining process by said cell basic information obtaining unit, and the reevaluating process by said verifying unit, said verifying unit makes a non-match decision, in which the to-be-verified biometric information image and the registered biometric information image are judged not to belong to one and the same user.

21. A biometric information verifying apparatus as set forth in claim 18, wherein, if said verifying unit judges that the third comparison result satisfy the predetermined alignment condition, said cell basic information obtaining unit obtains other kinds of cell basic information than the direction information, as the to-be-verified data, from the individual cells obtained by the redivision by said cell dividing unit, and also, said cell feature information obtaining unit obtains the minutia information, as the to-be-verified data, from the individual cells that are obtained by the redivision by said cell dividing unit, and said verifying unit then obtains a fourth comparison result by comparing at least the minutia information of corresponding cells between the thus obtained to-be-verified data and the registered data, and makes the match or a non-match decision based on the fourth comparison result.

22. A biometric information verifying apparatus as set forth in claim 17, wherein, if the second comparison result does not satisfy the predetermined match condition, the cell division reference point is shifted by a predetermined amount, and the processes subsequent to the alignment process between the to-be-verified biometric information image and the registered biometric information image, are then performed once again, and said verifying unit then obtains a fifth comparison result by comparing at least the minutia information of corresponding cells between the reobtained to-be-verified data and the registered data to reevaluate whether or not the fifth comparison result satisfies the predetermined match condition, and if the fifth comparison result satisfies the predetermined match condition, said verifying unit makes the match decision, and wherein, if the fifth comparison result does not satisfy the predetermined match condition even after a predetermined number of times of repetitions of the cell division reference point-shifting process and the processes subsequent to the alignment process, and the subsequent processes thereto, said verifying unit makes a non-match decision, in which the to-be-verified biometric information image and the registered biometric information image are judged not to belong to one and the same user.

23. A biometric information verifying apparatus as set forth in claim 16, wherein said verifying unit aligns the registered biometric information image and the to-be-verified biometric information image, such that a number of match cell pairs, which are pairs of cells, one from the registered data and the other from the to-be-verified data, having coincident direction information based on the first comparison result, is a maximum.

24. A biometric information verifying apparatus as set forth in claim 23,
wherein the maximum number of the match cell pairs serves as the direction information comparison result, and
wherein a condition that the maximum number of the match cell pairs is equal to or greater than a predetermined value or a condition that a match cell ratio, which is a ratio of the number of the match cell pairs to a total number of the cells obtained by the cell dividing unit, is equal to or greater than a predetermined value, serves as the predetermined alignment condition.

25. A biometric information verifying apparatus as set forth in claim 16, wherein said verifying unit obtains the second comparison result by comparing the minutia information of corresponding cells between the registered data and the to-be-verified data, and also obtains a sixth comparison result by comparing other kinds of cell basic information than the direction information of the corresponding cells, and evaluates whether or not the second and the sixth comparison results satisfy the predetermined match condition.

26. A biometric information verifying apparatus as set forth in claim 25, wherein the cell basic information includes pitch information and offset information, as well as the direction information, of the to-be-verified biometric information image in the individual cells.

27. A biometric information verifying apparatus as set forth in claim 26,
wherein the biometric information image is a ridge image obtained from a biometric pattern,
wherein the direction information is a ridge direction in the individual cell,
wherein the pitch information is a ridge pitch in the individual cell, and
wherein the offset information is an offset amount from a reference point in the individual cell.

28. A biometric information verifying apparatus which compares a registered biometric information image and a to-be-verified biometric information image input by a user at user verification, said apparatus comprising:
a cell dividing unit which obtains a number of cells by dividing an entire part of the to-be-verified biometric information image into a grid or matrix of a same shape as cells obtained through dividing an entire part of the registered biometric information image;
a cell basic information obtaining unit which obtains cell basic information from the individual cells that are obtained by said cell dividing unit, said cell basic information including direction information, pitch information, and offset information, of the to-be-verified biometric information image contained in the individual cells;
a cell feature information obtaining unit which obtains minutia information of the to-be-verified biometric information image, as cell feature information, from the individual cells that are obtained by said cell dividing unit; and
a verifying unit which verifies the to-be-verified biometric information image against the registered biometric information image by comparison between registered data and to-be-verified data,
said registered data including: (i) cell basic information obtained from individual cells making up the registered biometric information image, which cell basic information includes direction information, pitch information, and offset information, of the registered biometric information image contained in the individual cells; and (ii) cell feature information obtained from the individual cells making up the registered biometric information image, which cell feature information includes minutia information of the registered biometric information image contained in the individual cells, and
said to-be-verified data including the cell basic information and the cell feature information, which are obtained by said cell basic information obtaining unit and said cell feature information obtaining unit, respectively,
said verifying unit,
obtaining a first comparison result by comparing the direction information of the individual cells of the entire part of the to-be-verified biometric information image and the direction information of the individual cells of the entire part of the registered biometric information image, and aligning the entire part of the to-be-verified biometric information image and the entire part of the registered biometric information image with each other based on the first comparison result, and then obtaining a second comparison result by comparing the pitch information and the offset information of corresponding cells between the to-be-verified data and the registered data, and evaluating whether or not the second comparison result satisfies a predetermined alignment condition,
if the second comparison result satisfies the predetermined alignment condition, obtaining a third comparison result by comparing the minutia information of corresponding cells between the to-be-verified data and the registered data, and evaluating whether or not the third comparison result satisfies a predetermined match condition, and
if the third comparison result satisfies the predetermined match condition, making a match decision, in which the to-be-verified biometric information image and the registered biometric information image are judged to belong to one and the same user.

29. A biometric information verifying apparatus as set forth in claim 28,
wherein said cell basic information obtaining unit firstly obtains, as the to-be-verified data, cell basic information, which is required at aligning the to-be-verified biometric information image and the registered biometric information image with each other, from individual cells that are obtained by the cell dividing unit and making up the to-be-verified biometric information image, and wherein, if said verifying unit judges that the second comparison result satisfies the predetermined alignment condition, said cell feature information obtaining unit obtains the minutia information from the individual cells as the to-be-verified data.

30. A biometric information verifying apparatus as set forth in claim 29, wherein, if said verifying unit judges that the second comparison result does not satisfy the predetermined alignment condition, said cell dividing unit shifts a cell division reference point by a predetermined amount, and redivides the to-be-verified biometric information image into cells, and said cell basic information obtaining unit reobtains the cell basic information from the individual cells which are obtained by the redivision by said cell dividing unit, said verifying unit obtains a fourth comparison result by comparing the reobtained direction information of the individual cells of the to-be-verified biometric information image and the direction information of the individual cells of the registered biometric information image, and realigns the to-be-verified biometric information image and the registered biometric information image with each other based on the fourth comparison result, and then obtains a fifth comparison result by comparing the pitch information and the offset information of corresponding cells between the reobtained to-be-verified data and the registered data, and reevaluates whether or not the fifth comparison result satisfies the predetermined alignment condition.

31. A biometric information verifying apparatus as set forth in claim 30, wherein said cell dividing unit, said cell basic information obtaining unit, and said verifying unit repeat the redividing process, the reobtaining process, and the reevaluating process, respectively, until the fifth comparison result satisfies the predetermined alignment condition.

32. A biometric information verifying apparatus as set forth in claim 30, wherein, if the fifth comparison result does not satisfy the predetermined alignment condition even after a predetermined number of times of repetitions of the redividing process by said cell dividing unit, the reobtaining process by said cell basic information obtaining unit, and the reevaluating process by said verifying unit, said verifying unit makes a non-match decision, in which the to-be-verified biometric information image and the registered biometric information image are judged not to belong to one and the same user.

33. A biometric information verifying apparatus as set forth in claim 30, wherein, if said verifying unit judges that the fifth comparison result satisfy the predetermined alignment condition, said cell feature information obtaining unit obtains the minutia information, as the to-be-verified data, from the individual cells that are obtained by the redivision by said cell dividing unit, and said verifying unit then obtains a sixth comparison result by comparing the minutia information of corresponding cells between the reobtained to-be-verified data and the registered data, and evaluates whether or not the sixth comparison result satisfies the predetermined match condition.

34. A biometric information verifying apparatus as set forth in claim 29, wherein, if the third comparison result does not satisfy the predetermined match condition, the cell division reference point is shifted by a predetermined amount, and the alignment process between the to-be-verified biometric information image and the registered biometric information image and the subsequent processes thereto are then performed once again, and said verifying unit then obtains the seventh comparison result by comparing the minutia information of corresponding cells between the reobtained to-be-verified data and the registered data to reevaluate whether or not the seventh comparison result satisfies the predetermined match condition, and if the seventh comparison result satisfies the predetermined match condition, said verifying unit makes the match decision, and wherein, if the seventh comparison result does not satisfy the predetermined match condition even after a predetermined number of times of repetitions of the cell division reference point-shifting process, the alignment process, and the subsequent processes thereto, said verifying unit makes a non-match decision, in which the to-be-verified biometric information image and the registered biometric information image are judged not to belong to one and the same user.

35. A biometric information verifying apparatus as set forth in claim 28, wherein said verifying unit aligns the registered biometric information image and the to-be-verified biometric information image, such that a number of match cell pairs, which are pairs of cells, one from the registered data and the other from the to-be-verified data, having coincident direction information based on the first comparison result, is a maximum, or such that a match cell ratio, which is a ratio of the number of the match cell pairs to a total number of the cells obtained by the cell dividing unit, is equal to or greater than a predetermined value.

36. A biometric information verifying apparatus as set forth in claim 28, wherein the biometric information image is a ridge image obtained from a biometric pattern, wherein the direction information is a ridge direction in the individual cell, wherein the pitch information is a ridge pitch in the individual cell, and wherein the offset information is an offset amount from a reference point in the individual cell.

* * * * *